(12) United States Patent
Tyomkin

(10) Patent No.: US 11,941,915 B2
(45) Date of Patent: Mar. 26, 2024

(54) GOLF GAME VIDEO ANALYTIC SYSTEM

(71) Applicant: RoundU Technologies Ltd, UAB, Vilnius (LT)

(72) Inventor: Boris Tyomkin, Kfar-Saba (IL)

(73) Assignee: RoundU Technologies Ltd, UAB, Vilnius (LT)

( * ) Notice: Subject to any disclaimer, the term of this patent is extended or adjusted under 35 U.S.C. 154(b) by 660 days.

(21) Appl. No.: 17/106,116

(22) Filed: Nov. 29, 2020

(65) Prior Publication Data

US 2021/0089761 A1 Mar. 25, 2021

Related U.S. Application Data

(63) Continuation-in-part of application No. PCT/IL2019/050609, filed on May 28, 2019.
(Continued)

(51) Int. Cl.
*G06V 40/20* (2022.01)
*A63B 69/36* (2006.01)
(Continued)

(52) U.S. Cl.
CPC .......... *G06V 40/23* (2022.01); *A63B 69/3605* (2020.08); *A63B 69/3694* (2013.01);
(Continued)

(58) Field of Classification Search
CPC ............ A63B 69/3605; A63B 69/3694; A63B 71/0669; G06V 40/23; G06V 40/1365;
(Continued)

(56) References Cited

U.S. PATENT DOCUMENTS

| 9,694,267 B1 | 7/2017 | Thornbrue et al. |
| 2010/0210377 A1 | 8/2010 | Lock |

(Continued)

FOREIGN PATENT DOCUMENTS

WO 0238223 * 5/2002

OTHER PUBLICATIONS

Wang, et al. (Golf Swing Analysis with Event Based Vision), pp. 1-31. (Year: 2013).*

(Continued)

*Primary Examiner* — Daniel G Mariam
(74) *Attorney, Agent, or Firm* — Fresh IP PLC; Clifford D. Hyra; Aubrey Y. Chen

(57) ABSTRACT

A system and method for video analytics of a golf game is disclosed. In an embodiment, cameras capture videos from different angles of a golfer's swing and/or strike; a system network comprises: a processing module to receive the videos, to 3D-model the trajectory of the swing/strike, and 3D-model the golfer; a machine-learning module to receive 3D swing-trajectories and golfer models of swings/strikes of professional golfers and compute a 3D model of one or more reference swings, as a function of an aggregation of the professional golfers' swings/strikes; a database storing the reference swings/strikes; an analysis module configured to receive the golfer's 3D swing/strike trajectory model and the 3D golfer model, compare the 3D trajectory model with the reference swing, and compute recommendations for the golfer, as a function of the comparison; and a display module configured to display the recommendations to the golfer.

6 Claims, 10 Drawing Sheets

Related U.S. Application Data

(60) Provisional application No. 62/677,080, filed on May 28, 2018.

(51) Int. Cl.
| | |
|---|---|
| *A63B 71/06* | (2006.01) |
| *G06F 18/23213* | (2023.01) |
| *G06N 20/00* | (2019.01) |
| *G06T 7/277* | (2017.01) |
| *G06T 17/00* | (2006.01) |
| *G06V 20/40* | (2022.01) |
| *G06V 40/12* | (2022.01) |

(52) U.S. Cl.
CPC .... *A63B 71/0669* (2013.01); *G06F 18/23213* (2023.01); *G06N 20/00* (2019.01); *G06T 7/277* (2017.01); *G06T 17/00* (2013.01); *G06V 20/46* (2022.01); *G06V 40/1365* (2022.01); *G06T 2207/30224* (2013.01); *G06T 2207/30228* (2013.01); *G06T 2207/30241* (2013.01); *G06T 2210/12* (2013.01)

(58) Field of Classification Search
CPC .......... G06V 20/46; G06T 2207/30224; G06T 2207/30228; G06T 2207/30241; G06T 2210/12; G06T 7/00; G06T 7/277; G06N 20/00; G06F 18/23213
See application file for complete search history.

(56) References Cited

U.S. PATENT DOCUMENTS

| | | |
|---|---|---|
| 2015/0269435 A1 | 9/2015 | Bentley et al. |
| 2017/0001118 A1 | 1/2017 | Ibrahim et al. |

OTHER PUBLICATIONS

PCT Search Report for International Application No. PCT/IL2019/050609 dated Sep. 2, 2019, 17 pp.
PCT Written Opinion for International Application No. PCT/IL2019/050609 dated Sep. 2, 2019, 5 pp.
PCT Preliminary Report on Patentability for International Application No. PCT/IL2019/050609 dated Dec. 1, 2020, 6 pp.

\* cited by examiner

GOLF GAME VIDEO ANALYTIC SYSTEM

CROSS REFERENCE TO RELATED APPLICATIONS

This application is a continuation-in-part of international application PCT/IL2019/050609 filed May 28, 2019 which claims the benefit of priority of U.S. Provisional Application No. 62/677,080 filed May 28, 2018. The content of these applications are incorporated by reference herein in their entirety.

A list of references appears at the end of this Application. The references are herein incorporated by reference in their entireties.

FIELD OF THE INVENTION

The present invention generally pertains to an integrated analytic system and method to provide golf courses, golfers and coaches with new AI tools to improve the golfing experience. The improvement can come from improving utilization of the golf course, improving the quality of golfers' play, and by improving connectivity between golf courses, golfers and coaches.

BACKGROUND OF THE INVENTION

U. S. Patent Application Publication No. US2016/008696 discloses a golf game management system that integrates pre-game, in-game, and post-game activities for a golf game into a unified experience. Sensory devices are worn by the players during the game and can be tracked by sensors on a golf cart. A golf cart-mounted entertainment console includes video cameras and locally-mounted data processing components for modeling collected data. A cart-mounted interface, website, and mobile device application present game-related content that allows players to view and manipulate data before, during and after the game. Multiple data processing modules provide several functions built on data collected from playing a game of golf to enhance the golf experience. A player signals the golf cart to record a shot, acknowledge the club, selection, and adjust the score for the hole if a penalty stroke is incurred.

However, the system is not fully automated, since player signaling is need for, e.g. recording a shot. Furthermore, since the camera(s) are mounted on the golf cart, they cannot adequately follow the path of the ball.

U. S. Patent Application Publication No. US20170050659 discloses a control apparatus for a self-moving cart, in particular a golf caddy, comprising at least a speed control of a motor onboard the cart and a logical control unit which adjusts the speed control of the motor based on the relative position of a reference user. It further comprises a proximity detection device meant to face the rear side of the cart, with respect to the travelling direction, so as to detect a relative distance with respect to a user following the cart. The logical control unit is configured to determine the speed of the cart depending on the detected relative distance so that the distance is maintained in a tolerance range defined by a maximum distance and a minimum distance. The minimum distance is such as to enable the user to operatively reach on/off means of the apparatus which are installed onboard the cart.

However, the system relates only to control of the speed of the cart.

U. S. Patent Application Publication No. US2017-108608 discloses a robotic golf caddy with one or more of the following features: a camera to take video and/or pictures of a golf swing or other features or activities on a golf course. The robotic golf caddy can optionally include an image capturing system. The image capturing system can be mounted to the robotic golf caddy, and can include at least one camera (e.g., digital camera, video camera, digital video camera, etc.) capable of capturing frame images. The image capturing system (when used) can optionally include an information storage unit capable of storing the captured frame images, and/or a captured frame image classification unit capable of processing the captured frame images by operations utilizing, such as, for example, image classification technology, image recognition technology, image decoding technology, etc. The image capturing system can be in communication with the processor unit to assist in the navigation of the robotic golf caddy. One or more of the images captured by the image capturing systems can be transmitted to a remote location (e.g., the golf course club house, etc.). The robotic golf caddy can have other or additional features (e.g., one or more USB, Ethernet and/or HDMI outlets, Wi-Fi connection capabilities to access internet, one or more speakers, radio tuner, CD and/or DVD player, media interface to play music from a smart device, camera to take video and/or picture of golf swing or other features or activities on a golf course, one or more seating areas on the housing for a golfer, charger for remote transmitter etc.)"

However, US2017-108608 does not disclose calculating a trajectory for a ball nor automatic scoring for a golf game. Nor does it disclose tracking a ball to its resting site.

U. S. Patent Application Publication No. US2016-0088286 discloses a method comprising: capturing a 2D image in a specific format of an object, subject, and scene using a device; sensing an object, subject, and scene automatically and continuously using the device; analyzing the 2D image of the object, subject, and scene captured to determine the most relevant composition and direction model; transforming an object, subject, and scene into a 3D model using existing reference composition/architecture model; and storing the 3D model of the scene in a database for use and maintaining it in a feedback loop. The method further comprises coordinating accurate tracking of objects and subjects in a scene by orchestrating autonomous equipment movements using a feedback loop. The device is at least one of a camera, a wearable device, a desktop computer, a laptop computer, a phone, a tablet, or another mobile computer. A processing unit can exist on a user device, on-premises, or as an off-premises service to house the following modules: a sensing module that can understand the subjects and context of a scene over time via models; an analytics module that can analyze sensed scenes and subjects to determine the most relevant composition and direction models or create them if necessary; a composition/architecture module that can simultaneously store the direction of multiple subjects or objects of a scene according to one or more composition models; a direction/control module that can provide direction and control to each subject, object, and equipment individually and relative to a scene model; and a database that can store models for use and maintain them in a feedback loop with the above modules. Image processing, image filtering, video analysis motion, background subtraction, object tracking, pose, stereo correspondence, and 3D reconstruction are run perpetually to provide optimal orchestration of subjects and equipment in the scene without a human operator. The method can be applied to analysis of a golf swing. Once the swing has been scanned, with a pre-modeled club or putter, the model is available for immediate application and is stored in a database. A plurality of sensed movements can be synthesized into one, so that leading practice golf swings are sufficiently documented. Once stored, the models can be converted to compositional models, so that analysis and comparison can take place between the sensed movements and stored compositional swing, and direction and feedback can be given to the user.

However, US2016-0088286 does not disclose providing either the golf swing or an analysis of a golf swing to a remote coach to provide coaching for a golfer, nor does it disclose calculating a trajectory for a ball, automatic scoring for a golf game or tracking a ball to its resting site.

It is therefore a long felt need to provide an integrated system in which connectivity between a golfer and persons such as a coach is not limited by location, in which analysis of a golf swing is not limited to off-line analysis, in which connectivity between a golf course and a golfer need not be done manually and in which identification of unauthorized persons on a golf course need not be done manually.

SUMMARY OF THE INVENTION

It is an object of the present invention to disclose a system to provide golf courses, golfers and coaches with new AI tools to improve the golfing experience by at least one of: improving utilization of the golf course, improving the quality of golfers' play, and improving connectivity between golf courses, golfers and coaches.

The present invention provides a system for analyzing a golf game, comprising:
- an array of cameras having at least one camera, configured to be at least partially focusable on at least one element selected from a group consisting of at least a portion of at least n golfers, where n is greater than or equal to 1, at least one ball, at least a portion of at least one golf club, and any combination thereof; and
- said at least n golfers are associated with at least one golf club, each of said cameras configured to generate a plurality of frames of at least a portion of said at least n golfers, said array of cameras viewing said at least n golfers from at least one angle;
- wherein said array of cameras is configured to provide golf information with respect to said at least n golfers.

It is another option of the present invention to provide the system as defined above, wherein said golf information is selected from a group consisting of: identity of said at least n golfers, location of said at least n golfers, number of said at least n golfers in a flight, order of play for members of said flight, location of at least one portion of said at least n golfers, speed of movement of at least a portion of said at least n golfers, direction of movement of at least a portion of said at least n golfers, acceleration of at least a portion of said at least n golfers, pressure exerted on a golf club by at least a portion of said at least n golfers, stance of said at least n golfers, location of said at least one golf club, speed of movement of at least a portion of said at least one golf club, direction of movement of at least a portion of said at least one golf club, acceleration of at least a portion of said at least one golf club, pressure exerted on said ball by at least a portion of said at least one golf club, start of impact of golf club with ball, end of impact of golf club with ball, angle of golf club face with respect to the golfer, angle of golf club face with respect to the hole, location of ball on golf club head during the time the ball and golf club are in contact, height of golf club from ground during contact of the ball and the golf club, angle of golf club shaft at beginning of a stroke, angle of golf club shaft at start of contact of ball with golf club, angle of golf club shaft at end of contact of ball with golf club, angle of golf club shaft at the end of the stroke, moment exerted on said ball by said at least one golf club, force exerted on said ball by said at least one golf club, speed of said ball after impact, direction of movement of said ball after said impact, trajectory of said ball, point of impact of said ball, resting place of said ball and any combination thereof.

It is another option of the present invention to provide the system as defined above, wherein said information is a function of time.

It is another option of the present invention to provide the system as defined above, wherein said at least one camera is selected from a group consisting of: a standard camera, a wide-angle camera, a pan-tilt-zoom (PTZ) camera and any combination thereof.

It is another option of the present invention to provide the system as defined above, additionally comprising:
- at least one camera processor configured to control said focus and said angle for each of said array of cameras;
- at least one analysis processor configured to:
  3D model in real time a golf swing from at least a portion of said plurality of frames, said analysis of said golf swing comprising:
    identifying in 3D a location of at least a portion of a shaft of one of said at least one golf club in at least two of said plurality of frames, said location comprising an angle of inclination of said at least a portion of a shaft;
    identifying in 3D a location of a golf ball in at least one of said plurality of frames;
    identifying, from said plurality of frames, a 3D trajectory of said at least a portion of a shaft of said one of said at least one golf club during said golf swing; and
    determining, during said golf swing, a 3D location of an impact of said one of said at least one golf club with said ball; and
  determine 3D movement of said ball induced by said swing; said determination comprising:
    calculating, from said 3D trajectory of said golf swing and said 3D location of said impact, a trajectory for said ball;
    from said 3D trajectory, calculating an area defining likely locations of impact for said ball;
    focusing at least one of said array of cameras on at least a portion of said area defining likely locations of impact;
    identifying a location of said impact for said ball from at least one frame generated by said at least one of said array of cameras focused on at least a portion of said area defining likely locations of impact; and
    at least one of said array of cameras tracking said ball from said location of impact to a resting location.

It is another option of the present invention to provide the system as defined above, wherein said location of said ball is determinable from a Hough Line Transform of said frame.

It is another option of the present invention to provide the system as defined above, wherein a location of said at least one camera processor is selected from a group consisting of: integrated within a camera, local to a camera, in a main processing unit and any combination thereof.

It is another option of the present invention to provide the system as defined above, additionally comprising identifying if a swing hits or misses said ball.

It is another option of the present invention to provide the system as defined above, wherein control of said focus and said angle of each of said array of cameras is by control of at least one of pan, tilt and zoom of said each of said array of cameras.

It is another option of the present invention to provide the system as defined above, additionally configured to automatically generate, for said at least n golfers in a stroke play golf match, a score for each hole by: determining, for each golf swing, whether said golf swing is a stroke in which said at least one golf club has hit said ball; and generating said score per hole by summing the number of said strokes needed to transfer said ball from a tee to a hole associated with said tee.

It is another option of the present invention to provide the system as defined above, additionally configured to automatically generate, for said at least n golfers in a stroke play golf match, a total score by summing the score per hole for each hole played.

It is another option of the present invention to provide the system as defined above, additionally configured to automatically place said at least n golfers in focus in approximately a center of at least one frame of at said at least one camera.

It is another option of the present invention to provide the system as defined above, wherein said at least n golfers are uniquely identifiable by at least one of: facial recognition software, fingerprint recognition software and recognition of identification tags carryable on said at least n golfers.

It is another option of the present invention to provide the system as defined above, wherein at least one of said array of cameras is in a fixed location.

It is another option of the present invention to provide the system as defined above, wherein said angle of inclination of said at least a portion of a shaft of said one of said at least one golf club is continuously monitored by at least one of said array of cameras.

It is another option of the present invention to provide the system as defined above, wherein a beginning of a golf swing is identifiable by a deviation of said angle of inclination by a predetermined amount from an original angle.

It is another option of the present invention to provide the system as defined above, wherein said predetermined amount is a function of a distance between said ball and a hole.

It is another option of the present invention to provide the system as defined above, wherein said at least one analysis processor is additionally configured to determine an angle of said at least a portion of a shaft of said one of said at least one golf club with respect to the vertical at said time of impact with said ball.

It is another option of the present invention to provide the system as defined above, wherein said at least one camera is configured to determine a member of a golfer movement group consisting of: 3D location of at least a portion of a golfer, distance moved by said at least a portion of a golfer, direction moved by said at least a portion of a golfer, angle of inclination of at least a portion of a golfer, pressure exerted by a golfer on a golf club, and any combination thereof.

It is another option of the present invention to provide the system as defined above, wherein at least one member of said golfer movement group is a function of time.

It is another option of the present invention to provide the system as defined above, further configured to determine a member of a ball movement group consisting of: identify time and location of contact between said ball and said at least one club, provide images for analysis of a swing and any combination thereof.

It is another option of the present invention to provide the system as defined above, wherein at least one member of said ball movement group is a function of time.

It is another option of the present invention to provide the system as defined above, wherein at least one member of said golfer movement group is a function of time.

It is another option of the present invention to provide the system as defined above, further configured to determine a member of a golf club movement group consisting of: distance and direction moved by a golf club, golf club velocity as a function of time, golf club acceleration as a function of time, start of impact of golf club with ball, end of impact of golf club with ball, angle of golf club face with respect to the golfer, angle of golf club face with respect to the hole, location of ball on golf club head during the time the ball and golf club are in contact, pressure of golf club against ball, height of golf club from ground during contact of the ball and the golf club, angle of golf club shaft at beginning of a stroke, angle of golf club shaft at start of contact of ball with golf club, angle of golf club shaft at end of contact of ball with golf club, angle of golf club shaft at the end of the stroke, and any combination thereof.

It is another option of the present invention to provide the system as defined above, wherein at least one member of said golfer movement group is a function of time.

It is another option of the present invention to provide the system as defined above, wherein at least one of said array of cameras is focusable on a calculated location of probable impact of said ball.

It is another option of the present invention to provide the system as defined above, wherein at least one of said array of cameras is configurable to track said ball to a resting place.

The system as defined above, wherein at least one of said array of cameras is configurable to determine entrance of a ball into a hole.

It is another option of the present invention to provide the system as defined above, further configured to perform a member of a group consisting of: count hits, differentiate between practice swings and swings intended to hit a ball, identify time and location of contact between said ball and said at least one club, provide images for analysis of a swing and any combination thereof.

It is another option of the present invention to provide a method for analyzing a golf game, comprising steps of:
 providing a system for analyzing a golf game comprising:
  an array of cameras comprising at least one camera, configured to be at least partially focusable on at least one element selected from a group consisting of at least a portion of at least n golfers, where n is greater than or equal to 1, at least one ball, at least a portion of at least one golf club, and any combination thereof;
  said at least n golfers are associated with at least one golf club, each of said array of cameras configured to generate a plurality of frames of at least a portion of said at least n golfers, said array of cameras viewing said at least n golfers from at least one angle;
 at least partially focusing at least one of said array of cameras on at least one element selected from a group consisting of at least a portion of at least n golfers, at least one ball, at least a portion of at least one golf club, and any combination thereof; and generating said plurality of frames of said at least a portion of said at least n golfers;

thereby generating, via said array of cameras, golf information with respect to at least one of said at least n golfers.

It is another option of the present invention to provide the method as defined above, additionally comprising a step of selecting said information from a group consisting of: identity of said at least n golfers, location of said at least n golfers, number of said at least n golfers in a flight, order of play for members of said flight, location of at least one portion of said at least n golfers, speed of movement of at least a portion of said at least n golfers, direction of movement of at least a portion of said at least n golfers, acceleration of at least a portion of said at least n golfers, pressure exerted on a golf club by at least a portion of said at least n golfers, stance of said at least n golfers, location of said at least one golf club, speed of movement of at least a portion of said at least one golf club, direction of movement of at least a portion of said at least one golf club, acceleration of at least a portion of said at least one golf club, pressure exerted on said ball by at least a portion of said at least one golf club, start of impact of golf club with ball, end of impact of golf club with ball, angle of golf club face with respect to the golfer, angle of golf club face with respect to the hole, location of ball on golf club head during the time the ball and golf club are in contact, height of golf club from ground during contact of the ball and the golf club, angle of golf club shaft at beginning of a stroke, angle of golf club shaft at start of contact of ball with golf club, angle of golf club shaft at end of contact of ball with golf club, angle of golf club shaft at the end of the stroke, moment exerted on said ball by said at least one golf club, force exerted on said ball by said at least one golf club, speed of said ball after impact, direction of movement of said ball after said impact, trajectory of said ball, point of impact of said ball, resting place of said ball and any combination thereof.

It is another option of the present invention to provide the method as defined above, additionally comprising a step of generating said information as a function of time.

It is another option of the present invention to provide the method as defined above, additionally comprising a step of selecting said at least one camera from a group consisting of: a standard camera, a wide-angle camera, a pan-tilt-zoom (PTZ) camera and any combination thereof.

It is another option of the present invention to provide the method as defined above, additionally comprising steps of:
providing at least one camera processor configured to control said focus and said angle for each of said array of cameras;
providing at least one analysis processor configured to:
3D model in real time a golf swing from at least a portion of said plurality of frames, said analysis of said golf swing comprising:
identifying in 3D a location of at least a portion of a shaft of one of said at least one golf club in at least two of said plurality of frames, said location comprising an angle of inclination of said at least a portion of a shaft;
identifying in 3D a location of a golf ball in at least one of said plurality of frames;
identifying, from said plurality of frames, a 3D trajectory of said at least a portion of a shaft of said one of said at least one golf club during said golf swing;
determining, during said golf swing, a 3D location of an impact of said one of said at least one golf club with said ball; and
determining 3D movement of said ball induced by said swing; said determination comprising:
calculating, from said 3D trajectory of said golf swing and said 3D location of said impact, a trajectory for said ball;
from said 3D trajectory, calculating an area defining likely locations of impact for said ball;
focusing at least one of said array of cameras on at least a portion of said area defining likely locations of impact;
identifying a location of said impact for said ball from at least one frame generated by said at least one of said array of cameras focused on at least a portion of said area defining likely locations of impact; and
at least one of said array of cameras tracking said ball from said location of impact to a resting location.

It is another option of the present invention to provide the method as defined above, additionally comprising a step of determining said location of said ball from a Hough Line Transform of said frame.

It is another option of the present invention to provide the method as defined above, additionally comprising a step of selecting a location of said at least one camera processor from a group consisting of: integrated within a camera, local to a camera, in a main processing unit and any combination thereof.

It is another option of the present invention to provide the method as defined above, additionally comprising a step of controlling said focus and said angle of each of said array of cameras by controlling at least one of pan, tilt and zoom of said each of said array of cameras.

It is another option of the present invention to provide the method as defined above, additionally comprising a step of identifying if a swing hits or misses said ball.

It is another option of the present invention to provide the method as defined above, additionally comprising a step of automatically generating, for said at least n golfers in a stroke play golf match, a score for each hole by: determining, for each golf swing, whether said golf swing is a stroke in which said at least one golf club has hit said ball; and generating said score per hole by summing the number of said strokes needed to transfer said ball from a tee to a hole associated with said tee.

It is another option of the present invention to provide the method as defined above, additionally comprising a step of automatically generating, for said at least n golfers in a stroke play golf match, a total score by summing the score per hole for each hole played.

It is another option of the present invention to provide the method as defined above, additionally comprising a step of automatically placing said at least n golfers in focus in approximately a center of at least one frame of at said at least one camera.

It is another option of the present invention to provide the method as defined above, additionally comprising a step of uniquely identifying said at least n golfers are by at least one of: facial recognition software, fingerprint recognition software and recognition of identification tags carryable on said at least n golfers.

It is another option of the present invention to provide the method as defined above, additionally comprising a step of positioning at least one of said array of cameras in a fixed location.

It is another option of the present invention to provide the method as defined above, additionally comprising a step of continuously monitoring said angle of inclination of said at least a portion of a shaft of said one of said at least one golf club by at least one of said array of cameras.

It is another option of the present invention to provide the method as defined above, additionally comprising a step of identifying a beginning of a golf swing by a deviation of said angle of inclination by a predetermined amount from an original angle.

It is another option of the present invention to provide the method as defined above, wherein said predetermined amount is a function of a distance between said ball and a hole.

It is another option of the present invention to provide the method as defined above, additionally comprising a step of configuring said at least one analysis processor to determine an angle of said at least a portion of a shaft of said one of said at least one golf club with respect to the vertical at said time of impact with said ball.

It is another option of the present invention to provide the method as defined above, additionally comprising steps of configuring said camera to perform a member of a group consisting of: count hits, differentiate between practice swings and swings intended to hit a ball, identify time and location of contact between said ball and said at least one club, provide images for analysis of a swing and any combination thereof.

It is another option of the present invention to provide the method as defined above, additionally comprising a step of at least one of said array of cameras tracking said ball to a resting place.

It is another option of the present invention to provide the method as defined above, additionally comprising a step of at least one of said array of cameras determining entrance of a ball into a hole. It is another option of the present invention to provide the method as defined above, additionally comprising a step of said array of cameras providing golf information with respect to said at least n golfers.

It is another option of the present invention to provide the method as defined above, additionally comprising a step of selecting said at least one camera from a group consisting of: a standard camera, a wide-angle camera, a pan-tilt-zoom (PTZ) camera and any combination thereof.

It is another option of the present invention to provide the method as defined above, wherein at least one member of said ball movement group is a function of time.

It is another option of the present invention to provide a method for identifying and tagging objects on a golf course, the method characterized by steps as follows:

by means of $WAC_w$, providing real-time continuous images of a $FOV_{f\Delta t}$, w and f are integer numbers being equal or greater than 1, continuously processing said time-resolved images, thereby indexing objects$^i_{f\Delta t}$, if and when located within said $FOV_{f\Delta t}$; i is an integer number being equal or greater than 1;

continuously analyzing a first set of parameters related with said imaged-processed indexed-object thereby providing a time-resolved finger-print$^i_{FP\Delta t}$ of said object$^i_{f\Delta t}$;

continuously comparing said finger-print$^i_{FP\Delta t}$ with a database comprising a second set of parameters$_{DB}$ and fingerprints$_{DB}$ thereof;

if said parameters$^i_{\Delta t}$ or finger-print$^1_{FP\Delta t}$ thereof is an equivalent of said parameters$_{DB}$ and or finger-prints$_{DB}$ thereof, then tagging said object$^i$;

assigning $PTZ_z$ to said object$^i$; and by means of said $PTZ_z$, providing a real-time, continuous image of said tagged object$^i$.

It is another option of the present invention to provide the method for identifying and tagging objects on a golf course as defined above, wherein said the of analyzing comprises segmenting and/or clustering said image by at least one method selected from a group consisting of Region Based Segmentation; Edge Based Segmentation; Threshold Segmentation; Clustering Based Segmentation; divisive clustering; agglomerative clustering; K-Means Clustering; Fuzzy C-Means Clustering; Log-Based Clustering; Graph-Theoretic Clustering; clustering by Affinity, Distance, Intensity, Colour, texture or Motion and any combination thereof.

It is another option of the present invention to provide the method for identifying and tagging objects on a golf course as defined above, wherein the step of analyzing of said objects$^i_{f\Delta t}$ comprising step of image processing thereby tagging said objects$^i_{f\Delta t}$ to an image; said tagging is based upon one or more members of a group consisting of object physical features, including dimensions, proportions, telemetry, tag-based identification means, biometric parameters, smell, acoustic fingerprint, object's wearables, including clothes, shoes, jewelry, hats, watch, eye glasses, face recognition, belongings such as gulf clubs, ball or other playware, bags, keys, vehicles etc., signals, based on video analytic only or otherwise by including passive obtaining signals, and active signals, such as RFID, WIFI, BT, radio and cellular-communication signals to said video analytic; object's indicia, including license plate, labels, numbers, codes, barcodes, printed thereof; one or more of said object's associates at least one second objects, including object's family relative, coworker, animal (pet), group of associates, team, opponents.

It is another option of the present invention to provide the method for identifying and tagging objects on a golf course as defined above, wherein said first and second set of parameters$_{DB}$ and fingerprints$_{DB}$ thereof are selected from object's physical specifications, including motion, including reciprocation, articulation and rotation on every axis, open/close change of configurations, including body gestures, expressions and micro expressions, including sitting, smiling, shoelace tying, in golf: bunker shooting, greenside bunker shooting, shooting near wall of a bunker, chip shooting, sewing techniques, club head aiming; in baseball: swing, rock batting, catching, pitching; in American football: Passing the Ball, Blocking an opponent, catching the ball, rushing downfield, punts and kicks; in judo: hand throwing, hip throwing, foot throwing, grappling, body-striking; in soccer: Controlling the ball, Running with the ball, Passing the ball, Shooting, Goalkeeping techniques; in basketball: jump shot, lay-up, slam dunk, hook shot, alley hoop; in tennis: backhand, forehand and serving; dog agility techniques; in a vehicle: door opening, window shutting, lighting, wheel steering, key switching; and any mixture, combinations, shape, colors, indicia thereof It is another option of the present invention to provide the method for identifying and tagging objects on a golf course as defined above, wherein the step of analyzing of said object$^i_{f\Delta t}$ provides for object identification, specification, autorotation, authentication and for verification of data thereof.

It is another option of the present invention to provide a system for identifying and tagging objects on a golf course, characterized by one or more $WAC_w$, each of which is configured provide real-time continuous images of a $FOV_{f\Delta t}$, w and f are integer numbers being equal or greater than 1;

one or more $PTZ_z$, each of which is configured provide real-time continuous images of at least one $object^i$ within said $FOV_{f\Delta t}$, z and i are integer numbers being equal or greater than 1;

a processor and intercommunicated database, operatable in a method of continuously processing said time-resolved images, thereby index $object^i_{f\Delta t}$, if and when located within said $FOV_{f\Delta t}$;

continuously analyzing a first set of parameters related with said imaged-processed indexed-object thereby providing a time-resolved finger-$print^i_{FP\Delta t}$ of said $object^i_{f\Delta t}$;

continuously comparing said finger-$print^i_{FP\Delta t}$ with said database, comprising a second set of $parameter_{DB}$ and $fingerprint_{DB}$ thereof;

if said $parameters^i_{\Delta t}$ or finger-$print^i_{FP\Delta t}$ thereof is an equivalent of said $parameter_{DB}$ and or finger-$print_{DB}$ thereof, tagging said $object^i$; assigning $PTZ_z$ to said $object^i$; and by means of said $PTZ_z$, providing a real-time, continuous image of said tagged $object^i$.

It is a further object of the present invention to provide a system for providing a virtual golf coach, said system comprising one or more cameras configurable to capture a set of video recordings from one or more angles of a swing and strike of a golf club by a golfer;

a network of one or more servers, said network in communicative connection with said cameras and said network comprising a processing module configured to
receive said set of videos;
3D model the trajectory of said swing/strike;
3D model said golfer;

a machine learning module configured to
receive one or more of said 3D swing-trajectory and golfer models of said swings/strikes for one or more professional golfers;
compute a 3D model of one or more reference swings, as a function of an aggregation of said swings/strikes of professional golfers;

a database configured for storing said reference swing(s)/strike(s);

an analysis module configured to
receive said 3D swing/strike trajectory model for said golfer;
receive said 3D golfer model;
compare said 3D trajectory model with a said reference model;
compute one or more recommendations for said player, as a function of said comparison; said recommendations being a function of said machine learning and of said sets of videos for one or more said strokes of said player; and It is an option of the present invention to provide the virtual golf coach system as defined above, wherein computing said reference swing is further a function of recommendations of one or more golf experts.

It is another option of the present invention to provide the virtual golf coach system as defined above, wherein said 3D trajectory model is divided into a portion before said strike and a portion during said strike.

It is another option of the present invention to provide the virtual golf coach system as defined above, wherein said 3D trajectory model is computed as a polynomial.

It is another option of the present invention to provide the virtual golf coach system as defined above, wherein said 3D modeling of said golfer's swing draws bounding rectangles in said videos around said hands and said club and analyzes said rectangles based on HOG signs trained by an AdaBoost training algorithm.

It is another option of the present invention to provide the virtual golf coach system as defined above, wherein said processing model is further configured to compute a model of said golfer.

It is another option of the present invention to provide the virtual golf coach system as defined above, wherein said instructions comprise exercises for said player to improve his technique.

It is another option of the present invention to provide the virtual golf coach system as defined above, wherein said machine learning module, analysis module, and database are hosted on a cloud server It is another option of the present invention to provide the virtual golf coach system as defined above, further comprising a display device configured for displaying said recommendations.

It is another option of the present invention to provide the virtual golf coach system as defined above, wherein said processing module is configured to compute a trajectory of a golf ball driven by said strike, employing a Kalman filter algorithm.

BRIEF DESCRIPTION OF THE FIGURES

In order to better understand the invention and its implementation in practice, a plurality of embodiments will now be described, by way of non-limiting example only, with reference to the accompanying drawings.

DETAILED DESCRIPTION OF THE PREFERRED EMBODIMENTS

Figure 1A:
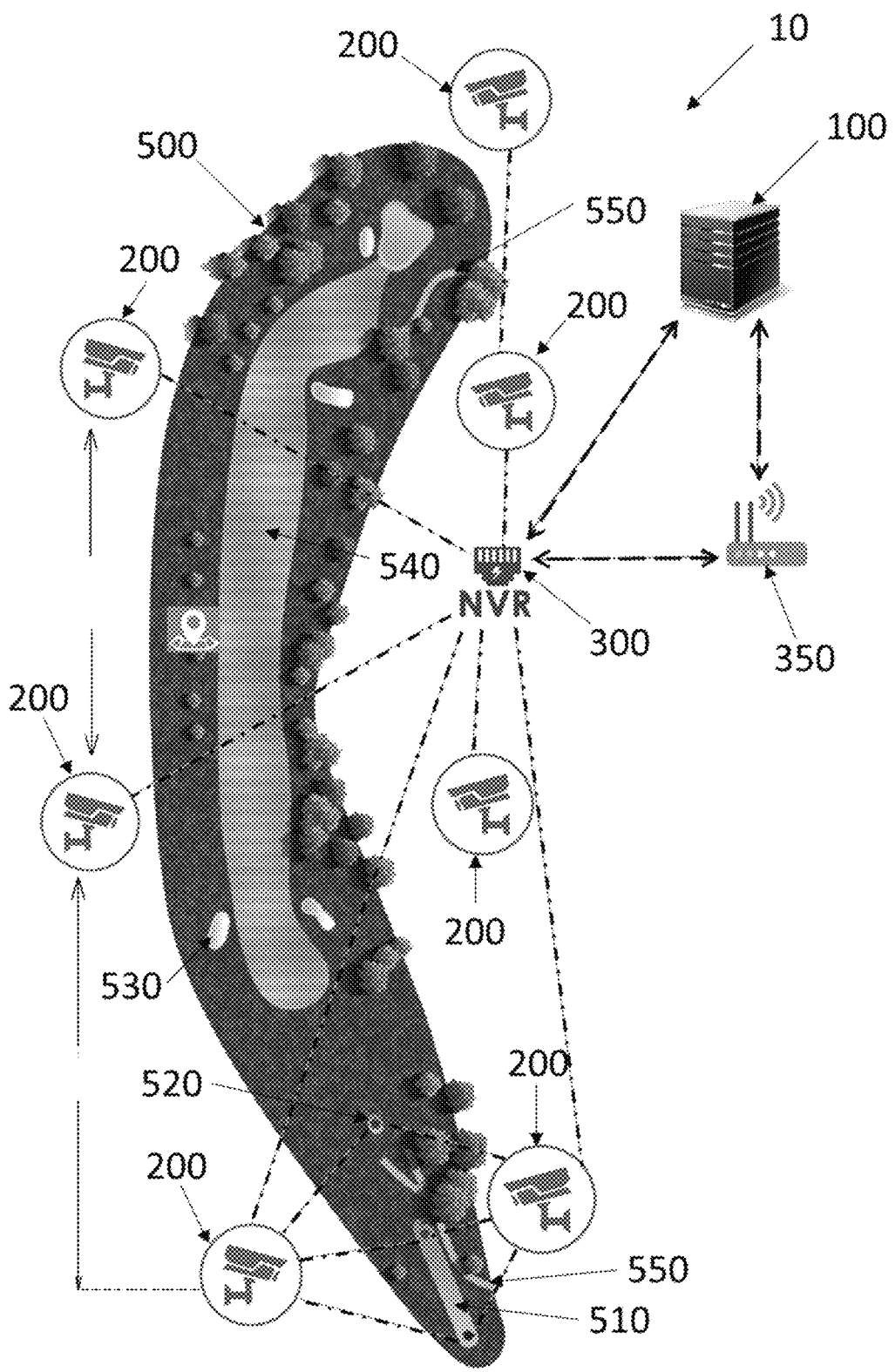
FIGS. 1A-B schematically illustrate a portion of a golf course.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method in which a golfer can interact in real time with at least one person, such as a golf coach, where the person is at a site remote from the golfer. Each golf stroke can be recorded and analyzed, providing both the golfer and the remote person with objective evidence of the swing, of contact of the golf club with the golf ball and of the subsequent flight of the golf ball. The system can keep score automatically.

The terms 'golfer' and 'player' hereinafter refer to a person using at least one golf clubs to hit at least one golf ball. The golfer can be, for non-limiting example, playing a game of golf, using a putting green, using a driving range, playing "crazy golf", or practicing golfing.

The terms 'golf ball' and 'ball' hereinafter refer to the ball used in a game of golf. The terms will be used interchangeably.

The term 'golf club' hereinafter refers to an implement used to hit a golf ball. A golf club typically comprises a grip at its proximal end, a head at its distal end and a shaft connecting the grip and the head. In use, the grip is held by a golfer and the golf ball is hit by the head. Typical types of golf clubs include a driver, a wood, a hybrid, an iron, a wedge and a putter.

The term 'user' hereinafter refers to any person observing the activities of a golfer. A user can be, for non-limiting example, a coach, a golfing professional, another golfer, or service personnel. The user can be at a location remote from the golfer. A non-limiting example of service personnel is a person watching a golf course to ensure that no golfers are unduly delaying following golfers.

The term 'golf course' hereinafter refers to any area where golfing can occur and to the management and control needed for the purpose of enabling golfers to play a game of golf. Typically, a golf course is a conventional golf course, which may belong to a golfer's club, commonly referred to as a golf club. To avoid confusion with the implement used to hit a golf ball, the term "golf course" and not "golf club" will be used herein. As used herein the term can include, but is not limited to, a putting range, a driving range, a practice area, or a virtual reality course.

The terms 'golf game' and 'round' hereinafter refer to a complete set of golfing activities, played according to predetermined rules. A typical golf game comprises a predetermined number of holes, typically 9 or 18 holes, played in a predetermined order. A game of crazy golf also comprises a predetermined number of holes played in a predetermined order. A golf game on a driving range could comprise a predetermined number of golf balls hit by each golfer.

The term 'service personnel' hereinafter refers to one or more persons authorized by a golf course to be present on the golf course. Typically, a service personnel is an employee of the golf course, but can be a volunteer or an employee of another establishment permanently or temporarily stationed on or around the golf course. Non-limiting examples of service personnel include, match supervisors, groundsmen, marshals and greenkeepers.

The term flight' hereinafter refers to a number of golfers playing as a group. Typically, golfers play as twosomes or foursomes; in some variants a golfer can play on his own.

The terms 'authorized personnel' and 'authorized people hereinafter refer to persons who have permission to be on at least a portion of a golf course. Authorized people include, but are not limited to, golfers, users, and service personnel.

The terms 'unauthorized personnel', 'authorized person' and 'unauthorized people' hereinafter refer to persons who do not have permission to be on at least a portion of a golf course. Unauthorized people include, but are not limited to, intruders, golfers at a wrong hole, and service personnel without permission to be in the portion of the golf course where they are found, for non-limiting example, a clerk handling payment and booking would not normally be in the vicinity of a tee box.

The term 'frame' hereinafter refers to a complete camera image. A video will comprise a number of frames. For non-limiting example, a 2-minute video made at 60 frames per second will comprise 7200 frames.

The term 'image' hereinafter refers to an object in said frame. Non-limiting examples of an image include a golf club, a ball, a person, and a tree.

The term 'swing' hereinafter refers to the physical act by a golfer of moving a golf club so as to hit a ball to imitate hitting a ball or to practice the movements of hitting a ball. A golfer can make a practice swing to check stance, "feel" of a golf club, etc. A golfer can swing and miss a ball, or swing and hit a ball.

The term 'strike' hereinafter refers to the impact on a golf ball that occurs while the golf club is in contact with the ball.

The term 'shot' hereinafter refers to the progress of the ball from the time it is hit until it stops moving.

The term 'stroke' hereinafter refers to a transfer of a ball from one location to another by means of hitting it with a golf club. A stroke will comprise a swing and a shot. The number of strokes needed to transfer a ball from a tee to its associated hole, plus any penalty points assessed, gives the score for the hole.

The system of the present invention provides an integrated analytic system to provide a golfer and golf course management with automated tools for automation and visualization of a golf game. The system can comprise any or all of: automated scoring, providing a stroke history including locating each stroke on a map of the golf course, video recording of a golfer's swings, analysis of a golfer's swings including determining the moment and/or force of the impact of golf club with ball, usage of golf clubs, determination of the location of a golfer and the movement of the golfer on the golf course, and management and coordination of multiple sets of golfers on a golf course, possibly including identifying and locating unauthorized people on the course.

Determination of force and/or moment can be via analysis of a video.

Determination of the location of people on the course is preferably by means of analysis of video provided by an array of cameras; identification of authorized people can be by means of facial recognition, identification by clothes and/or skin, location of a mobile phone and/or a token, and any combination thereof.

Non-limiting examples of ways in which the system of the present invention can enhance the golfing experience:

For a golf course:

More services can be provided to golfers and/or members, increasing opportunities to generate revenue.

A live view of what is happening on the course is available.

Speed of movement data are automatically collectable, allowing alerts of slow golfers and warnings to slow golfers, on the one hand, and seeding of golfers on the other hand so that, in competitions, the slower golfers start later and do not impede the faster ones.

Automatically identifying authorized and unauthorized persons, so that only permitted persons can access the course.

Automatic detection and identification of locations of golf carts, enabling monitoring usage of golf carts and the amount of time each cart is used.

Provide automated scoring. This increases player comfort and ensures fair play by eliminating the need to manually mark a scorecard, thereby eliminating errors in scoring, eliminating time spent marking scorecards, and eliminating worry over the possibility of scoring errors. It also reduces costs, as score cards, pens and marker services will no longer need to be provided.

A proven score may be provided, which can be sent to the golf federation as a signed scorecard. The golfer thereby has a proven handicap and does not require other forms of proof such as another person to vouch for him.

Automatically posting and sharing scores with an audience in real time. Immediate handicap (HCP) updating.

Automatic shot tracking, stroke details, zoom on green, played shots tracking, stroke video player, and a result analysis, can be provided in real time or near real time.

For golfers:

Provide powerful tools to improve golfing skills.

Swings can be automatically modeled and, in at least some embodiments, automatically analyzed in 3D.

A golfer can choose a coach from anywhere in the world and invite the coach to watch the play online. The coach can provide real-time analysis of the player's swing, stance, golf club choice, etc. A coach can also drill a golfer during practice.

automatically share swing/stroke videos in near real time with a network of professional coaches for tips and suggestions Provide advice and assistance to avoid practicing incorrectly.

Provide a swing/stroke video collection for at least one of real-time and offline analysis of a member of a group consisting of: the golf club grip, the golfer's balance the golfer's follow-through, the angle of the golf club face during a swing, the trajectory of the ball after impact, any other feature of a swing or stroke, and any combination thereof.

Data on strokes can be automatically collected, allowing analysis of historical data so that suggestions as to golf club choice can be provided.

Invitations to play can be received from anywhere in the world

A golfer can have a 3D map of the course.

For coaches:

Coaching can be provided to an enormous number of golfers worldwide.

Invitations to coach can be received from anywhere in the world.

For the golf-interested public:

Videos, overview, etc. can be uploaded to social networks to persuade people to participate in other golf activities.

Social involvement:

A golfer can share an interesting moment of the game "by click" with friends who don't play yet.

Golfer handicaps and game plans can be shared.

Golfers can set up "virtual flights". In a virtual flight, a "virtual twosome" or "virtual foursome" is created, with at least one of the golfers on a different course from the other members of the virtual flight, for non-limiting example, a virtual foursome consisting of one twosome on course "A" and another twosome on course "B". Each twosomes would start each hole at about the same time as the other twosome; scoring would be as normal for a foursome.

In the system of the present invention, a golfer can interact in real time with at least one person, such as a golf coach, where the person can be at a site remote from the golfer. Each golf stroke can be automatically recorded and automatically analyzed, providing both the golfer and the remote person with objective evidence of the swing, of contact of the golf club with the ball and of the subsequent flight of the ball.

In some embodiments, at least a portion of at least one swing or stroke of a golfer can be zoomed in on, thus enabling a close-up view of that portion of the swing or stroke. The zooming can be of the club movement, of the ball movement, of the stance, of the balance of the follow-through, of any other portion of a swing or stroke and any combination thereof.

In some embodiments, at least a portion of a recorded swing or stroke in a video collection can be zoomed in on. The zooming can be of the club movement, of the ball movement, of the stance, of the balance of the follow-through, of any other portion of a swing or stroke and any combination thereof.

The golf course personnel can observe the golfer, and can automatically provide advice, alerts or warnings, where needed, or can automatically dispatch golf personnel to the location of the golfer if needed, for non-limiting example, if a golfer or flight is playing too slowly and is delaying other golfers, if an unauthorized person is on the course, if there is a medical emergency, or if there is a violation of course etiquette.

Figure 1B:
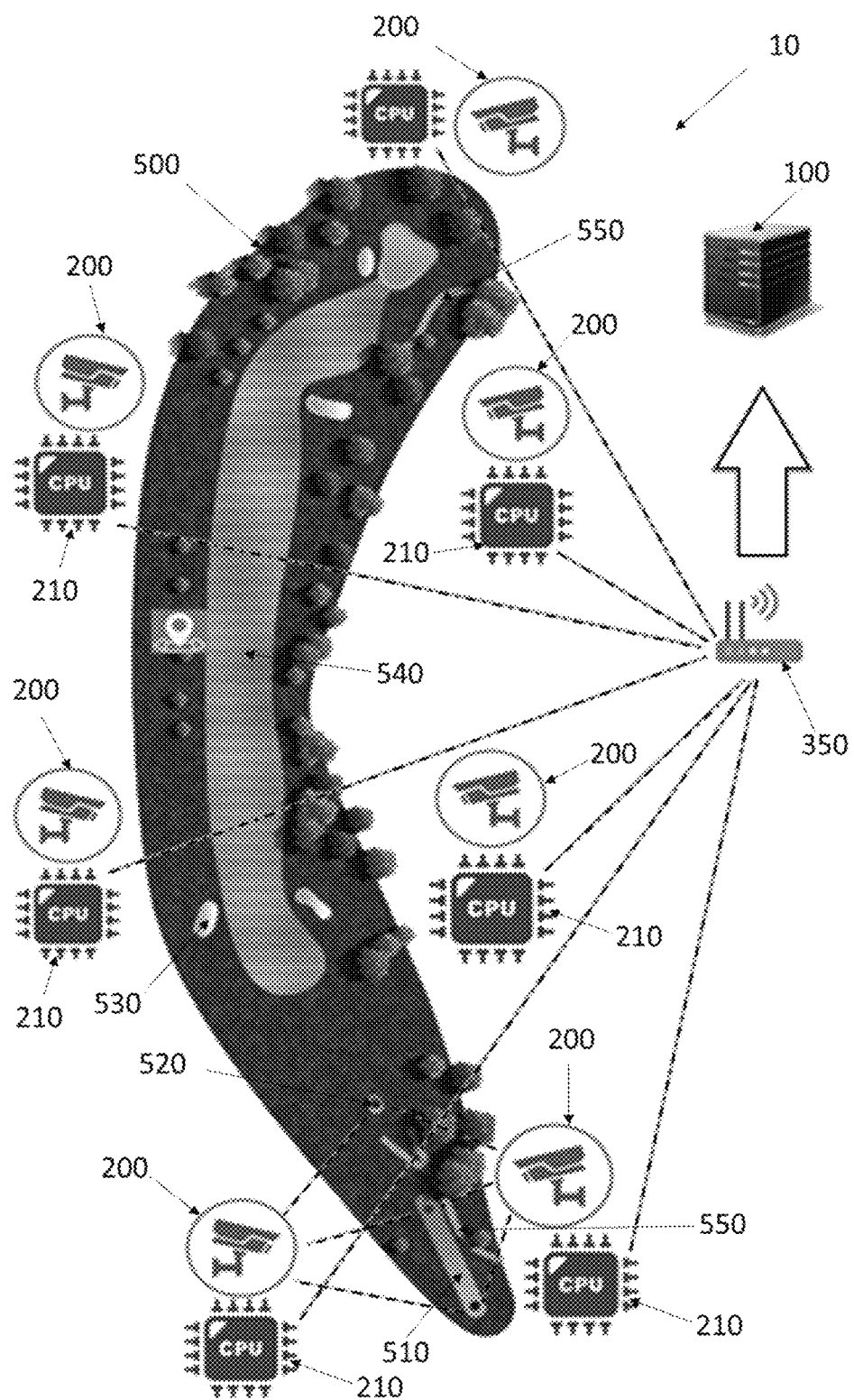

FIG. 1A-B schematically illustrate a section (500) of a golf course, illustrating an embodiment of the system of the present invention (10). The section (500) of the golf course, as shown, comprises a tee box (510), a hole (520), a fairway (540), hazards (530), and paths (550).

In the embodiment of FIG. 1A, an array of fixed cameras (200), able to automatically pan, tilt, zoom and focus, view the course and any people thereon (not shown). The cameras (200) are in communication with (dot-dashed lines) at least one video recorder (NVR, 300) to record the frames of video from the various cameras (200). Control of pan, tilt, zoom and focus can be associated with an individual camera (200) (a smart camera), with software in the video recorder (300) (dumb camera), and any combination thereof. The at least one video recorder (300) is in two-way communication with a main processing unit (100) and with a communication management system (350), with the main processing unit (100) also in two-way communication with a communication management system (350).

Any camera (200) can be standard camera, with a standard field of view, a wide-angle camera, with a field of view significantly wider than that of a standard camera, a pan-tilt-zoom (PTZ) camera and any combination thereof.

A camera can be a fixed camera, with a fixed location in the golf course.

A video recorder (300) can be configured to analyze images in the frames of video, and send the analyzed frames of video to the main processing unit (100). The main processing unit (100) is configured to perform at least one of: accept analyzed frames of video from a video recorder (300), analyze images in the frames of video, generate appropriate responses to the analyzed images (as described herein), generate a command to control at least one of pan, tilt, zoom and focus of at least one camera (200), generate a warning, generate an alert, generate a communication link with remote personnel, and carry out a function associated with management of a golf course.

The communication management system (350) is configured to transmit information such as, but not limited to, a video frame, an analyzed video frame, information extracted from at least one analyzed video frame, a warning, text, an image, sound, and any combination thereof to remote personnel, golf course authorized personnel, unauthorized persons, golf coaches and any combination thereof, either on the golf course or off it.

The communication management system (350) can comprise Wi-Fi, Bluetooth, radio-frequency identification (RFID), a real-time location system (RTLS), radio, a local radio system (LoRa), a Sigfox™ device, near-field communication (NFC), video wired communication, a ZigBee communication protocol, and any combination thereof.

In the embodiment of FIG. 1B, an array of fixed cameras (200), able to automatically pan, tilt, zoom and focus, view the course and any people thereon (not shown). Each camera (200) is in communication with a local processor (130) to record the frames of video from the various cameras (200). Control of pan, tilt, zoom and focus can be associated with an individual camera (200) (a smart camera), with software in the local processor (130) (dumb camera), and any combination thereof. Each local processor (130) is in two-way communication (dot-dashed lines) with a communication management system (350), which is in communication (white arrow) at least one main processing unit (100).

Any camera (200) can be standard camera, with a standard field of view, a wide-angle camera, with a field of view significantly wider than that of a standard camera, a pan-tilt-zoom (PTZ) camera and any combination thereof.

The main processing unit (100) is configured to perform at least one of: accept analyzed frames of video from a video recorder (300), analyze images in the frames of video, generate appropriate responses to the analyzed images (as described herein), generate a command to control at least one of pan, tilt, zoom and focus of at least one camera (200), generate a warning, generate a communication link with remote personnel, and carry out a function associated with management of a golf course.

The communication management system (350) is configured to transmit information such as, but not limited to, a video frame, an analyzed video frame, information extracted from at least one analyzed video frame, a warning, text, an image, sound, and any combination thereof to remote personnel, golf course authorized personnel, unauthorized persons, golf coaches and any combination thereof, either on the golf course or off it.

The communication management system (350) can comprise Wi-Fi, Bluetooth, radio-frequency identification (RFID), a real-time location system (RTLS), radio, a local radio system (LoRa), a Sigfox™ device, near-field communication (NFC), video wired communication, a ZigBee communication protocol, and any combination thereof.

In some embodiments, a golfer (600) can be videoed by an array of cameras (200), preferably with each camera in communication with a local processor (not shown), as described above, each camera configured with pan, tilt and zoom, so as to provide at least two images of the golfer (600), in focus, and in sufficient detail, preferably near the center of at least one video frame. The local processor may employ an algorithm to locate the golfer (600) in a specific area of a frame.

Preferably, all of pan, tilt and zoom for each camera are controllable by the local processing unit. Possibly, analysis of the frames occurs in the local processor (not shown). The local processors (not shown) for the array of cameras (200) are in communication (210) with a communication management system (not shown) and a main processing unit (100). The communication is configured to ensure that each of the at least n golfers, where n is an integer greater than or equal to one, on the course is accurately trackable with location known from analysis of at least one camera image and that sufficient cameras view each golfer during the golfer's swing that 3D images of the golfer's swing are extractable from the images. Location of a golfer may be calculated from the video enabling, for example, selection and steering of one or more PTZ cameras to the golfer.

Each video from each of the array of cameras (200) can be transmitted to the main processing unit (100) for storage and for analysis.

Preferably, the main processing unit (100) also maintains consistency of software and firmware version for all units (cameras, processing units, communication systems, etc.) in the system.

The system includes an array comprising at least two cameras configured to automatically provide at least one and preferably a plurality of frames comprising an image of at least n golfers and, preferably, at least one and preferably a plurality of frames comprising an image of at least one golf ball. Each at least one frame is storable in at least one database. The system further comprises a processor configured to automatically analyze images comprising a moving golf ball and to determine therefrom, in 3D, the trajectory of the ball for at least one golfer's stroke and, preferably, the trajectory for each of the golfers' at least one ball during its flight through the air. In some embodiments, at least one camera can follow the at least one ball during its flight.

In some embodiments, the location of the at least one ball's impact on the ground is determinable, either from calculation from the trajectory or from following the trajectory by at least one camera, or both. In some embodiments, at least one camera can follow the ball after landing, so that, for each stroke, the resting position of the ball is known. In some embodiments, the system is configured to inform a golfer of at least one resting position of at least one ball. In some embodiments, each golfer can be informed, at any time, in real time, of the location of a ball he has hit. For non-limiting example, a golfer can be informed of the location of the ball while it is in the air, of the location where it hit the ground, of its location on the ground while rolling, and of its location on the ground when it has come to rest (resting position).

A golfer can be informed of a location of at least one ball by any means known in the art. Typically, a display screen is used, with the location(s) of the ball(s) indicated thereon, preferably superimposed on a map of the golf course or other golfing establishment.

The map of the golf course or other golfing establishment can be generated from an existing map; from manually-entered distances, directions and heights; from ground-based measurements; from at least one 3D image of at least a part of the golf course generated by a drone, and any combination thereof.

Cameras may be located so as to provide up to 100% coverage of the golf course, so that each portion of the golf course can be viewed by at least one and preferably a plurality of cameras. In cases of partial coverage, it is possible that the system cannot report scoring, but at least some other services (described herein) may still be available. It is advantageous to minimize the total number of cameras, to minimize costs, to minimize the need for camera maintenance, to minimize the infrastructure needed to support the cameras, and to simplify the software needed to select camera(s) for tracking.

In some embodiments, there is some redundancy in the system, so that "spare" cameras are available when and where needed. Such optimization is preferably done with artificial intelligence (AI), which can identify cameras seldom used, overlaps of field of view, locations where extra cameras are needed (obstacles, areas with many people, areas exposed to weather, etc.) and other items affecting the optimum locations for cameras.

The stored images, the analyzed images, the ball trajectory(s) and locations(s), as well as other information as disclosed below, can be transmitted to other golfers or to users. For non-limiting example, a golf stroke (possibly including the ball's trajectory) can be transmitted to at least one coach so that coaching, either in real time or after the stroke, can be given by a person remote from the golfer. In another non-limiting example, a golfer can transmit a stroke to a friend playing on another golf course.

Transmission of information to another person, such as but not limited to a coach, another golfer, a referee, a golf club functionary, and any combination thereof can be by means of an application, an SMS, a text message, a video message, a telephone call and any combination thereof. In preferred embodiments, an application is used.

Information can be uploaded, as described hereinbelow, to social media. Uploading to social media can be by means of an application, an SMS, a text message, a video message, a telephone call and any combination thereof. In preferred embodiments, an application is used.

The number of persons (golfers, golf course authorized personnel, unauthorized persons, golf coaches and any combination thereof) in at least a portion of a golf course can be determined from a member of a group consisting of: the number of golfer identification tags image-recognized in the at least a portion of the golf course, image analysis identification of persons in the at least a portion of the golf course.

In some embodiments, the image analysis is by means of facial recognition software, as is known in the art. In some embodiments, the image analysis will use neural network software ("machine learning") to improve the accuracy of facial recognition. Image analysis can be used, either in conjunction with or independently of facial recognition, to recognize a golfer's shape, size, coloring, clothing and any combination thereof.

It can be possible that a ball's trajectory or its movement after impact on the ground cause the ball to leave the golf course or to reach a portion of the golf course where it is inaccessible to a golfer, for example, to land in branches of trees on the golf course. In preferred embodiments, the system can alert the golfer that the ball has left the course or is otherwise inaccessible.

Preferably, each camera provides automatic pan, tilt, and zoom and automatic focusing on a desired object, plus at least one of automatic selection and automatic tracking of the desired object. The desired object is typically a golfer during a stroke, but can be a ball being tracked and, in some embodiments, the desired object can be a person or thing which does not belong on the golf course such as a non-golfer, an intruder, an animal, an unexpected obstruction, and any combination thereof.

For non-limiting example, using at least one of automatic pan, automatic tilt, automatic zoom, automatic focusing, automatic selection and automatic tracking, a golfer preparing to tee off can be in focus in an array of cameras, so that the swing can be recorded for viewing and can be analyzed in 3D, and also visible in sufficient detail so that analysis is accurate enough to follow the subsequent trajectory of the ball. In some embodiments, a swing is also displayable in 3D. Detail is also needed for image analysis, when this is done, and, in some embodiments, for identification of the type of golf club used.

Typically, in the system of the present invention, the only swings that are analyzed are strokes.

Analysis of a swing can be made from image analysis. In preferred embodiments, a neural network combined with visual analytics is used to analyze the swing.

During image analysis, an environment can be scanned. Comparison between one frame and at least one subsequent frame can identify pixels where at least one of color, intensity or brightness has changed. From the change, moving objects in the frame can be determined and, using a neural network combined with visual analytics, the nature of the moving object(s) can be identified (portion of golfer, golf club, ball, wind-blown tree, intruder, animal, etc.)

In preferred embodiments, the locations of objects in the environment are stored and are changed with time as appropriate.

AI can be used to improve identification of a stroke and of the trajectory and landing position of a ball. The learned identifiers and identification mechanisms will be different for each golf course, since no two golf courses are alike—their backgrounds will differ, both in the locations of greenery and fixed items on the golf course and in the locations of greenery, hills and fixed items off the golf course but visible from it; their landscapes differ, with higher and lower areas in different locations; their hole distances and tee locations will differ, their layouts will differ; the locations, shapes, sizes and types of hazards will differ, and so on. Even for a single golf course, the course will change over time as, e.g., trees grow, they are added, pruned and removed; hazards are added, changed or removed; tee layouts are changed, and so on.

The software for capture and analysis of a swing, for analysis of a scene, for data management, and for storage of data can be located in a local processor, in a main processing unit, in a server, in the cloud, and any combination thereof, with the portions of the software in the local processor(s), in the main processing unit, in the server(s) and in the cloud in communication with each other.

In the following embodiment of capture and analysis of a swing, a portion of the software is on a remote main processing unit, while another portion of the software is on at least one local processor.

In a first step, a next golfer is identified from an order of golfers determined by a main processing unit. Based on the location of the next golfer, determined by any of the methods disclosed herein, at least one local controller in communication with at least one camera points at least two cameras to the location indicated by the main processing unit, setting the required rotation angle, pan, tilt, zoom and sharpness for each of the cameras. At least two cameras are needed to observe the golfer, so that in any position the golfer can see the ball and shaft. After positioning of the at least two cameras, the local controller determines, for each camera, whether the player is present in the frame using the Local Binary Pattern (LBP) cascade, Haar cascade or any other indicator. To confirm the presence of a player in the frame, a neural network can be used that gives the probability of having a player in the frame. Definition of whether the frame(s) are acceptable is almost complete.

The golfer's identity and location can be determined Haar cascades and neural network, or by image segmentation.
1. Haar cascades and neural network player allocation via the Haar cascades
   A. preparation of cascades based on training data (player, ball, other items on the field)
   B. adaptation of the results of cascade work (software screening of false positives)
   C. highlighting the posture during swing and impact
2. Image segmentation
   A. Selection of the fastest segmentation method
      i. Methods based on clustering
      ii. Methods using a histogram
      iii. Graph cutting methods
   B. Selecting from the segmented images of goals (building a hierarchy of objects in the image)
      i. Classification of objectives
      ii. Highlighting priority objectives Analysis of the player's position (defining the actions based on the player's pose) follows identifying the golfer and the golfer's location
   i. Splitting the image of the player into the component parts (hands, legs, trunk)
   ii. Determination of the direction
   iii. Building a body model and comparing it with templates In some embodiments, once the location of the golfer in a frame is determined, fine adjustment of pan, tilt and zoom of the camera generating that frame can be used to place the golfer in focus in approximately the center of the frame. Preferably, adjustment of focus is not made after a start of a swing.

In some embodiments, the movements of at least n of the golfers around the course are both tracked and recorded, in addition to videoing and analyzing strokes of the at least n golfers. From the movement patterns and timings, AI can be used to analyze a golfer's moves. Pattern(s) of movement can also be used to identify golfers. Pattern(s) of movement can include, but are not limited to, swing characteristics, patterns of golf club use, and movement patterns before, during and after swinging. Such identifying patterns can be used to improve identification of each golfer and to improve identification and notification of the golfer to play next.

Figure 2:
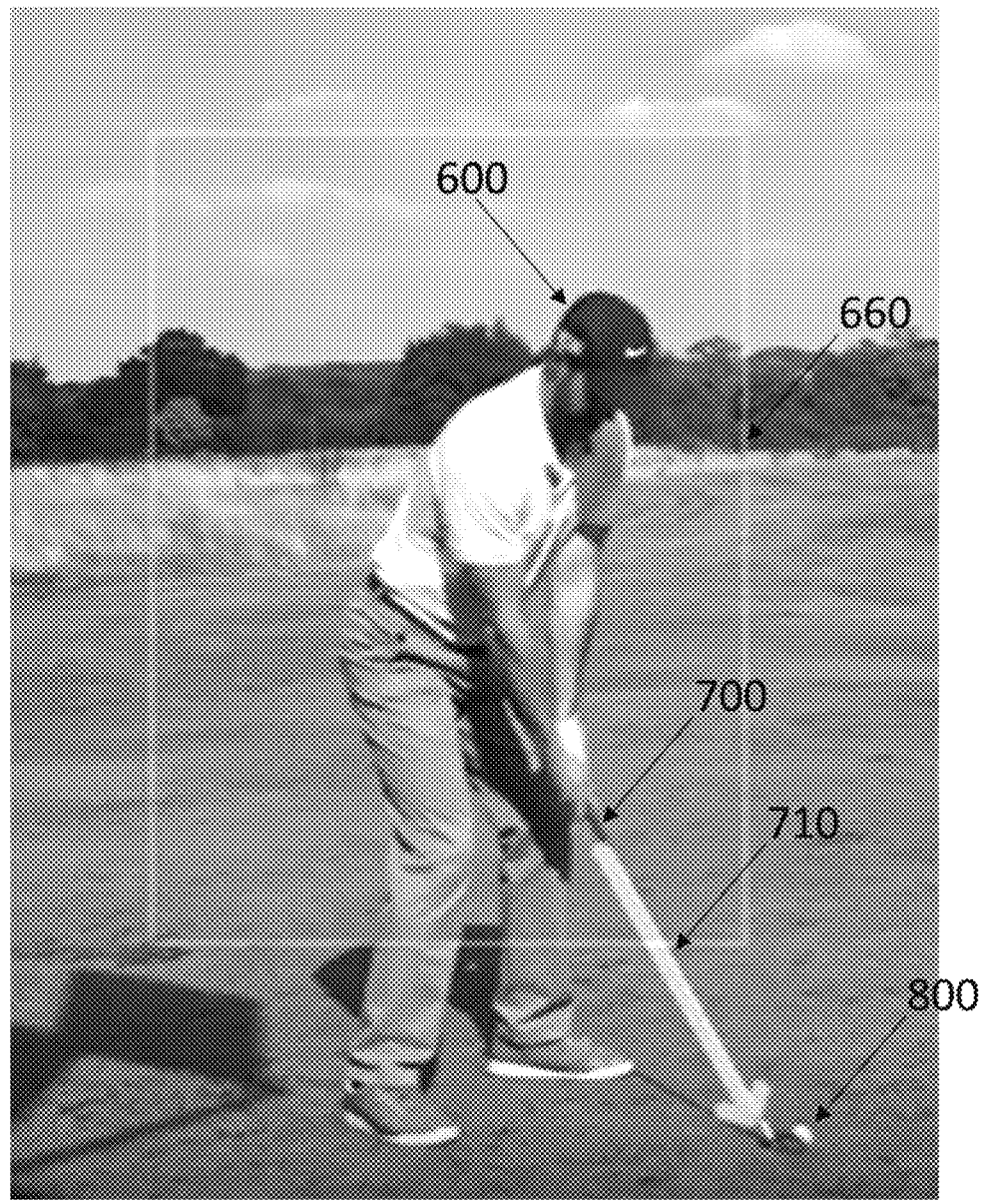
FIG. 2 illustrates an embodiment of a method of analyzing a golf swing.

FIG. 2 shows an embodiment of a method of analyzing a golf swing.

In some cases, the ball is not visible before impact, for non-limiting example, if the ball is in a sand trap, in a low spot in the ground, in a bunker or in the rough. If the ball is not visible before impact, the moment of impact can be determined by characteristics of the golf ball after impact (such as direction, velocity, and acceleration) from the video data. In some embodiments, AI is employed to compute ball characteristics or trajectory.

After the location (660) in the frame of the golfer (600) and the location in the frame of the shaft (700) of the golf club have been determined and, if possible, the location of the ball has been determined, continuous monitoring of the angle of inclination of the golf club shaft (700) begins, and, as soon as the shaft angle deviates from the original angle by a predetermined amount (the threshold being set depending on the distance to the hole), it is considered that the golfer (600) will be able to strike the ball (800). As soon after this point as the shaft (700) passes through the vertical and the angle of inclination continues to change, it is determined whether there is still a ball (800) in its original place in the frame. If the ball (800) is there, the stroke was either a training swing or a miss. If the stroke is identified as a miss, then a penalty is added to the golfer's score.

If the ball is gone, confirm the hit. If the ball location previous to impact was known, the next step is, for each camera, to return to a frame a predetermined number of images back from the frame where the hit was confirmed. In this previous frame, the ball (800) should be in its original, unmoved position. If not, return back a second predetermined number of frames, until a frame is found with the ball (800) in its unmoved place.

If the ball location before impact was not known, the next step is to step forward through the frames until an image comprising the ball is found.

Then the frames are stepped through, one by one, selecting those frames comprising an image of the ball (800), thereby generating, for each camera, a set of frames, the set comprising at least two frames, where the ball (800) has moved between frames. This set of frames depicts the ball (800) flying out of the field of view of the camera. By the ball's (800) locations in the frames in the set, the angle of departure and speed of the ball (800) can be determined. The data obtained from the array of cameras can be combined to determine, in 3D, the angles of departure of the ball (800) and to improve the accuracy of the determination of the ball's speed. Cameras likely to be able to observe the possible location of the ball's (800) impact can then be aligned and focused on the possible locations of the ball's (800) impact, providing a mosaic of frames covering these locations. In preferred embodiments, at least one of the cameras likely to be able to observe the possible location of the ball's (800) impact will observe the impact and at least one camera will then track the ball (800) until it stops moving, thereby enabling the location of each ball (800) in play to be storable in a database.

In some embodiments, at least one camera can remain focused on the (now stationary) ball (800) until that ball is next played, whereupon the above cycle restarts. In some embodiments, tracking of a ball (800) is suspended until the ball (800) is to be played again, whereupon at least one camera is focused on the known location of the ball (800).

During play of a hole, at least one camera can remain continuously aimed at and focused on the hole where the golfer must score the ball. As soon as one of the cameras confirms the presence of the ball in the hole, at least one camera can be aimed at a next golfer, identifiable as disclosed above.

To determine the presence of "superfluous" or unauthorized people on the course, at least one free camera (a camera not being used to track a golfer, analyze a golf swing, or track a ball) can be used and the LBP cascade, trained for humans, as is known in the art, can identify any person in the field of view. The at least one free camera can continuously scan the course, and, as soon as the LBP cascade is triggered, the triggering object is checked. If the triggering object is in a location identifiable as that of a golfer or service personnel, the object is not "superfluous". If the triggering object (typically a person) is not so identifiable, a warning signal is sent to the main processing unit with the coordinates and photo of the object.

In preferred embodiments, a golfer is automatically notified that play can start—that the golfer can now start a game or round. In some variants of these embodiments, a golfer is given a warning a predetermined time before the estimated start time for the game or round. In some variants of these embodiments, a golfer is also automatically notified of the other golfers in a flight.

In some embodiments, the order in which golfers in a flight play is determinable from the location of the balls, with the golfer associated with each ball determinable from at least one of analysis of the stroke and tracking of the trajectory of the ball and its movement on the ground. In some variants of such embodiments, the system can inform members of the flight of the order in which they are to play, such as by providing at least one signal, visually, aurally, tactilely and combination thereof, indicating the identity of the golfer to play next. A non-limiting example of an aural signal is the utterance of a name of a golfer. A non-limiting example of a tactile signal is a vibrating signal feelable by the golfer indicated. Non-limiting examples of a visual signal include a light of a predetermined color and illumination associated with a golfer's name.

In preferred embodiments, the system can store and display the names(s) of the golfer(s), at least one distance between at least one tee and its associated hole, at least one distance between at least one ball and the hole being played, and at least one score for at least n golfers.

In some embodiments, the system can provide a warning if at least one of the following occurs: if a golfer has broken a rule of golf or has violated golf etiquette, if a flight is getting too close to another flight (typically the flight ahead of them), if a golfer is standing too close to a golfer who is playing, if a golfer is standing in an illegal position, and if a movable object such as a person, animal or golf cart or is in a position where it is not unlikely to be hit by a ball if play continues.

The warning can be visual, audible or tactile. An audible warning is typically a buzzer, a siren, or words. A visual warning is typically a light, either steady or flashing, which can be from an independent light source or can be an illuminated area on a screen, or words on a screen. A tactile warning is typically a vibration feelable on the skin.

In some variants of these preferred embodiments, the system can add appropriate points to a score if a golfer violates a rule of golf or violates a rule of golf etiquette. In other variants, after the warning has been provided, a golfer or a marker manually updates the score.

The system comprises a data management system, configured to determine and to store at least one of the following: a name of a golfer, a score for a golfer, a rule book for a golf game for that golf course, an etiquette book for a golf game for that golf course, a map of at least a portion of the golf course, a name of a broken rule, a name of a violated etiquette, a number of broken rules, a number of violated items of etiquette, a number of golfers on a golf course, a number of golfers in a flight, a number of flights on the golf course, a time of start of a golf game, a time of start of a golf round, a time of ending of a golf game, a time of ending of a golf round, a time per hole for a golfer, a time per hole of a flight, a time of entrance of a golfer to a golf course, a time of departure of a golfer from a golf course, a start time provided to a golfer, a number of golf-course authorized personnel on a golf course, a location of a golfer on a golf course, a location of a golf-course authorized personnel on a golf course and any combination thereof.

A golfer's name can be determined by at least one of the following: facial recognition by a smartphone camera, a golfer can enter it manually, golf course personnel can enter it manually, a marker can enter it manually, it can be determined automatically from recognition of an identification tag uniquely identifying a golfer, it can be determined automatically from a payment record, and from any other means known in the art for uniquely identifying a person.

In some embodiments, the data management system comprises at least one model of human movement, so that walking, running, standing, sitting, lying down, and swinging are identifiable from determined movements of the objects in the field of view of at least one camera. In some variants of these embodiments, the neural network can be used to identify persons in the field of view from their movements. In some variants of these embodiments, the identity a golfer playing next is identifiable from his movements (e.g., a person walking toward a known position of a ball is probably a golfer playing next, a person walking towards a tee box is probably the golfer teeing off next, etc.). As described above, if a golfer appears to be attempting to play out of order, a warning can be provided to the golfer.

The system of the present invention can be in real-time communication with at least one of: an application and a dedicated screen. In preferred embodiments, real-time communication via at least one application can enable, at least one of the following: two-way communication between a golfer and at least one golfing coach or other golfing professional, two-way communication between a golfer and at least one other person, uploading of material to a social network, uploading material to the Internet, downloading material from a social network, and downloading material from the internet.

In preferred embodiments, real-time communication via the dedicated screen comprises communication with golf course personnel, such as, but not limited to, alerts and warnings.

However, an embodiment can comprise any combination of at least one dedicated screen and at least one application for any communication.

The two-way communication can include vocal communication, images and any combination thereof.

A frame can comprise a 2D image. It can be a frame comprising an image of a portion of a golfer's swing, an image of a portion of a trajectory of a ball, an analyzed image of at least a portion of a swing, an image of at least a portion of an exemplary swing, an analyzed image of at least a portion of an exemplary golf swing, at least a portion of an exemplary ball trajectory, and any combination thereof.

Non-limiting examples of social networks include: Facebook, WhatsApp, QQ, WeChat, Tumblr, Instagram and Twitter.

A golfer can therefore use the system to receive, in real-time or near real time, advice on their play from a remote expert, with the remote expert provided with an objective analysis of the golf stroke, in some embodiments, including at least one of: at least a portion of the ball's trajectory, the location relative to the start of the stroke of the impact point of the ball, the location relative to the golf course of the impact point of the ball, the distance from start of stroke to impact point, the location relative to the start of the stroke of the resting location of the ball, the location relative to the golf course of the resting location of the ball, the distance from start of stroke to resting location, and any combination thereof. The golfer can also receive advice on golf club use and other advice as appropriate, based on the remote expert's observation of the objective analysis of the stroke.

A remote user can be informed, in real time or near real time, of the progress of play, including watching the play and seeing the score, penalty points and the reasons for the same.

In some embodiments, service personnel can observe the play and can provide, either remotely or in person, advice or assistance to a golfer, remind a golfer of course rules and etiquette, or suggest means for speeding up play if a flight is delaying the progress of other flights.

In some embodiments, examples of the manner in which a golfer can check in to a course include: check in with course personnel (as has been done in the past), check in via an application, check in via facial recognition software using a camera near an entrance to the golf course, check in via facial recognition using an application on a handheld device such as, but not limited to, a smartphone, check in via fingerprint recognition using an application on a handheld device such as, but not limited to, a smartphone, and any combination thereof.

In some embodiments, examples of the manner in which power can be provided comprise one or more members of a group consisting of: a fixed camera, a local processing unit, and any combination thereof include: a solar panel, a solar cell, a conventional wired power supply, and any combination thereof.

In preferred embodiments, the pan, tilt and zoom of at least one camera is controllable by an AI system configured to track each golfer and to pan, tilt and zoom at least one camera to get an optimum angle for viewing the golfer for each of the at least one cameras viewing the golfer.

In some embodiments, the golf course, can automatically generate at least one of promotions, tournament information and invitations according to the handicaps of the golfers using the golf course.

It should be noted that any subset of the functions disclosed herein can comprise an embodiment of the invention.

An embodiment of software modules for the system comprises modules for (1) management of golfer(s) or other user(s) of the system (user application), (2) general management and record keeping (payment from or to users, tracking flights, advertising, publicizing, etc.) (administration application), (3) management of course marshals (marshal application), (4) internal software (swing analysis, course layout, camera layout, camera control, etc.) (main processing unit side)

1. User application
   1.1. User registration. Name, email, HCP calculation method (from predefined list) (see HCP calculation, section 2.17, below)
   1.2. Book a round
   1.3. Invite friends to join (See section 4.3, below)
   1.4. Game check-in
      1.4.1. Check in from smartphone. The system will check the GPS locations of the golfer's smartphone for matching
      1.4.2. Check in via facial recognition at or near an entrance to the course.
   1.5. View an interactive golf course with golfers marked (friends will be marked differently) or filtered "friends only".
   1.6. See both tournament history and live results
   1.7. See rounds history
   1.8. Manage albums of photos and videos
   1.9. Share tournament results
   1.10. Share round results
   1.11. Share photo and/or videos
   1.12. Golf course news
   1.13. Golf course chat
   1.14. Alerting chat (for golf course administration only) combined with lighting, sound, vibration.
   1.15. Document management
   1.16. Commercial information: advertisements for resorts, clubs, tournaments, equipment, etc.
   1.17. Players' golf course information: best scoring golf courses
   1.18. Watching other players' profile, history, HCP . . . results (by permission)
   1.19. Friends list management. The user will receive any friends' activity, such as: getting to a course, booking a round, starting a round, finishing a hole, finishing a round, made par, made bogey, made eagle, made albatross, made hole-in-one, golf course best result, etc. Another alert can be configured by a user. If a friend is on a course, alerts are by applications only. If a friend is not on a course, the system will send, by SMS, significant alerts only: start and finish of a round.
   1.20. Turn on or off alerts to friends.
   1.21. Instructor reservation for in game regime
   1.22. Instructor reservation for post game
   1.23. Strokes visualization by cartoon or augmented reality. A visualization will show the course as background, the stroke, ball flight and ball landing (see FIG. 2)
   1.24. Analyze golfer's swing as a 3D model
   1.25. Payments module, services, equipment purchasing (See 2.15 below)
   1.26. Purchasing history
   1.27. Credit information: money or services
   1.28. Registering a golfer's bag, including the golfer's golf clubs, and their model and manufacturer. Registration could be done manually or by taking a photo of a golf club.
   1.29. Provide and alert to the golfer 10 minutes before a round starts. If a golfer misses a start time, provide another start time.

2. Administration application
   2.1. Golf course member registration/management
   2.2. Sending golf course member/visitor invitation to application
   2.3. Tournament creation/management/invitation
   2.4. Publish tournament results view/2.5.
   2.5. Tracking camera use—cameras watching automatically or manually. Cameras in service or cameras free
   2.6. Alert creation/management
      2.6.1. Alert creation for special events: send an SMS if a round lasts more than 4 hours
      2.6.2. Create an alert if a golfer is moving at less than a predetermined speed
      2.6.3. Create an alert if a golf cart has been in use for more than a predetermined time
      2.6.4. Create an alert if a golfer does not start a game on time
   2.7. Event report builder
   2.8. Event publishing
   2.9. New competition creation and publishing: best driver of week, best result of the day, prize sponsorship information, etc.
   2.10. Live map view
   2.11. Live golf cart map view
   2.12. Player detailed reports: rounds, round times, hole times, etc.
   2.13. Service pricelist management
   2.14. Payment report management
      2.14.1. Player payment/services management/reporting
   2.15. Booking management
   2.16. Setup of parameters: maximum time for hole, maximum strokes per hole, etc.

Figure 3:
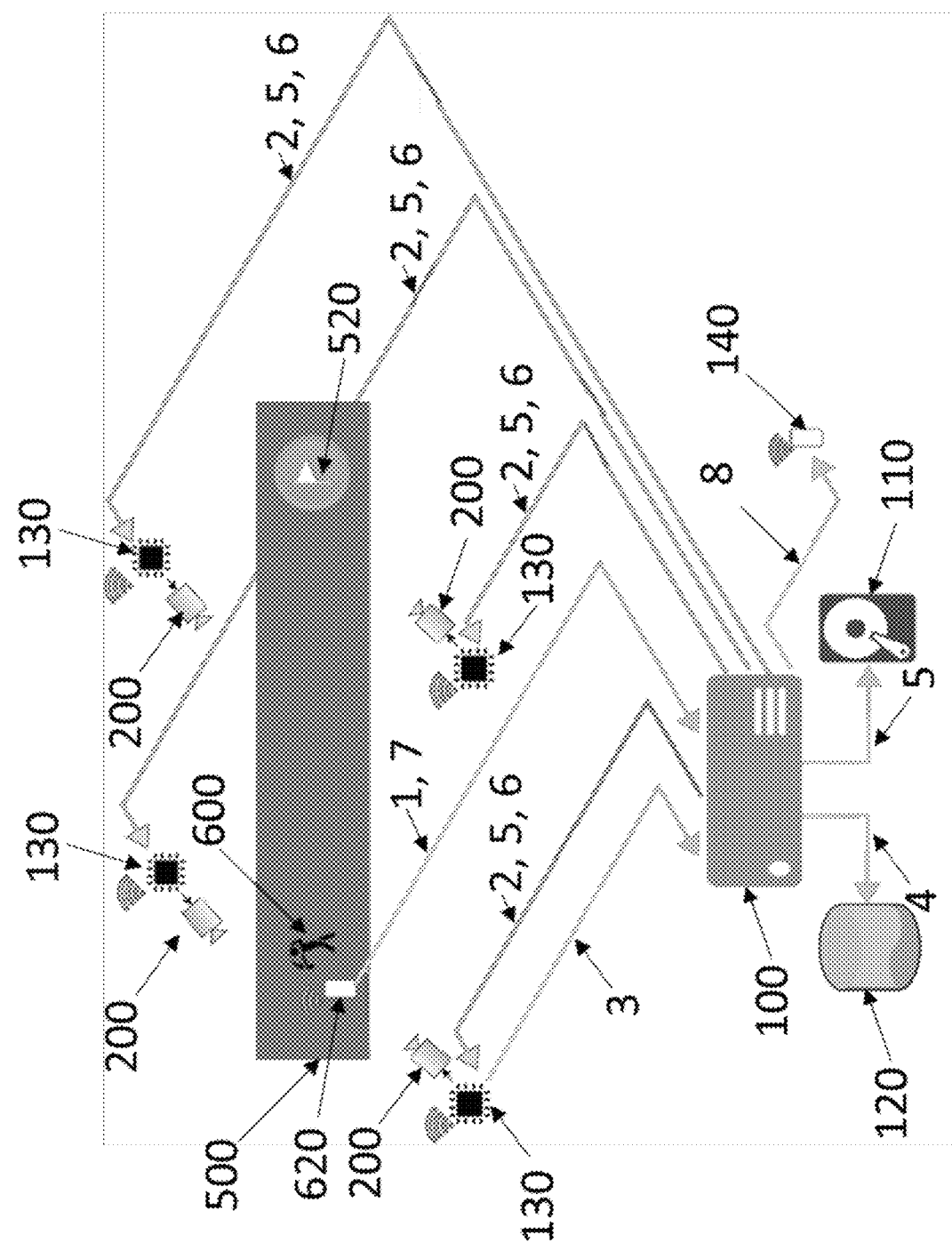
FIG. 3 schematically illustrates steps in a method of operating the system of the present invention.

2.17. HCP calculation builder. There can be more than one method of calculating a HCP. (See section 1.1 above)
2.18. Calculate round result. There can be more than one method of calculating a round result.
2.19. Live feed with all events on course. (See section 1.20 above)
3. Marshal's application
   3.1. Map of live players on course
   3.2. Map of live golf carts on course
   3.3. Speed live players are moving
   3.4. Booking list
   3.5. Booking change alert
   3.6. Event log
   3.7. Chat
   3.8. Event reporting—photos and publishing
   3.9. Receiving all system alerts
4. Main processing unit side
   4.1. Video analytics/Model management
   4.2. Player, caddy, marshal, marker, other golf course authorized personnel check in at registration by video camera, fingerprint, application (See section 1.2 above)
   4.3. Send alerts (invite friend to play a round, etc.) by application or SMS (See section 1.3 above)
   4.4. Calculate scores
   4.5. Live scores translation
   4.6. Analysis and management of golfers' location
   4.7. Record swing coordinates
   4.8. Camera management
   4.9. Swing video downloading
   4.10. System status monitoring: cameras, power sources, Wi-Fi signaling, etc.
   4.11. Player tracking
   4.12. Player analysis
   4.13. Location monitoring for all golfers
   4.14. Golf cart monitoring (route, time, tracking)
   4.15. Identification of unauthorized persons
   4.16. Analysis of swing details
   4.17. Ball launch analysis
   4.18. Ball landing place calculation
   4.19. Stroke counting (by player)
   4.20. Shooting club registration (by RFID, NFC, BLE, Wi-Fi, Bluetooth, radio, LoRa, a Sigfox™ device, near-field communication (NFC), video, a ZigBee communication protocol)
   4.21. 3D Cartoon/augmented reality generation including shot, flight, drop and ball resting place. (See Section 1.23 above)
   4.22. Application program interface (API) to point of service (POS)
   4.23. Interface and API for competition creation: best shot, best result
   4.24. Alert generation: send alert to client. "Move to next hole" . . .
   4.25. Marshal/Administration information any violation about: time on hole exceeded, strokes on hole exceeded, etc.
   4.26. Live feed translation to external sources: TV, marshals' applications, administration, web site, golf course Facebook etc.
5. System Administration
   5.1. The system should be installed with a first Admin user
   5.2. User creation/modification
   5.3. User permissions management
   5.4. Events teaching module
   5.5. Course management: creation
   5.6. Course maps upload
   5.7. Course 3D model management/upload
   5.8. Course greens 3D model management/upload
   5.9. Camera management: Add new camera, remove, edit . . .
   5.10. Camera management view: list. map
   5.11. Cameras on course location tool. Based on cameras technical specification, the system will show the zone each camera covers, including bunkers, tees, fairways, greens, holes, hazards, obstacles, rough, etc.
   5.12. Course surface marking: tees, greens, fairway, rough etc. . . .
   5.13. Management of GPS coordinates of tees, holes
   5.14. Wired/Wireless (Wi-Fi) communication management FIG. 3 schematically illustrates steps in a method of operating the system of the present invention. A golfer (600) is playing on a section of a golf course (500); a number of strokes will put the ball (not shown) in a hole (520). An array of cameras (200) are videoing the golfer (600), the hole (520) and the grounds of the golf course (500). Pan zoom and tilt of the cameras (200) are controllable by processing units (130). In this exemplary embodiment, the processing units (130) are local to the cameras (200). A camera processing unit (130) can be integral to the camera (200), be local to the camera (200), form a part of the main processing unit (100) and any combination thereof. The cameras (200) are in communication with a main processing unit (100), which is in communication with a database (120) to store the current state of the game and the position(s) of the golfer(s) (600), a database (110) to store the videos of each stroke by each golfer, with the videos identifiable by stroke and golfer, and a client (140) to display current results.

In a first step (1), each golfer's (600) identity and location are store in the main processing unit.

In a second step (2), cameras (200) are focused on the golfer (600) (by altering, where necessary, pan, tilt, zoom and any combination thereof) and on the hole (520), with information on the direction to focus being sent to the camera processing units (130) from the main processing unit (100) based on the golfer (600) and hole (520) to be tracked.

In a third step (3), videos of the golfer are captured, analyzed by a local processor and the analysis and, preferably, the video as well, are transmitted to the main processing unit (100), the main processing unit (100) storing them (5) in a database (110). Instructions to change focus of the camera (200) can be sent to the camera processing unit during the videoing and storage (5) of the video.

At step 6 (6), the golfer, has completed one stroke. Preferably, the location of the ball for that golfer is stored in preparation for that golfer's next stroke. The main processing unit determines a next golfer (600) to play and sends instructions to at least one of the camera processing units (130) to redirect at least one camera to follow the next golfer (600), and the cycle repeats until all members of the flight have completed their round.

The main processing unit (100) determines the current state of the game and the positions of the golfers and stores (4) these in a database (600). At any time, data can be displayed (8) on a client (140); the main processing unit (100) and the client (140) can be in communication with remote golfers, users, club personnel, coaches and any combination thereof.

Figure 4:
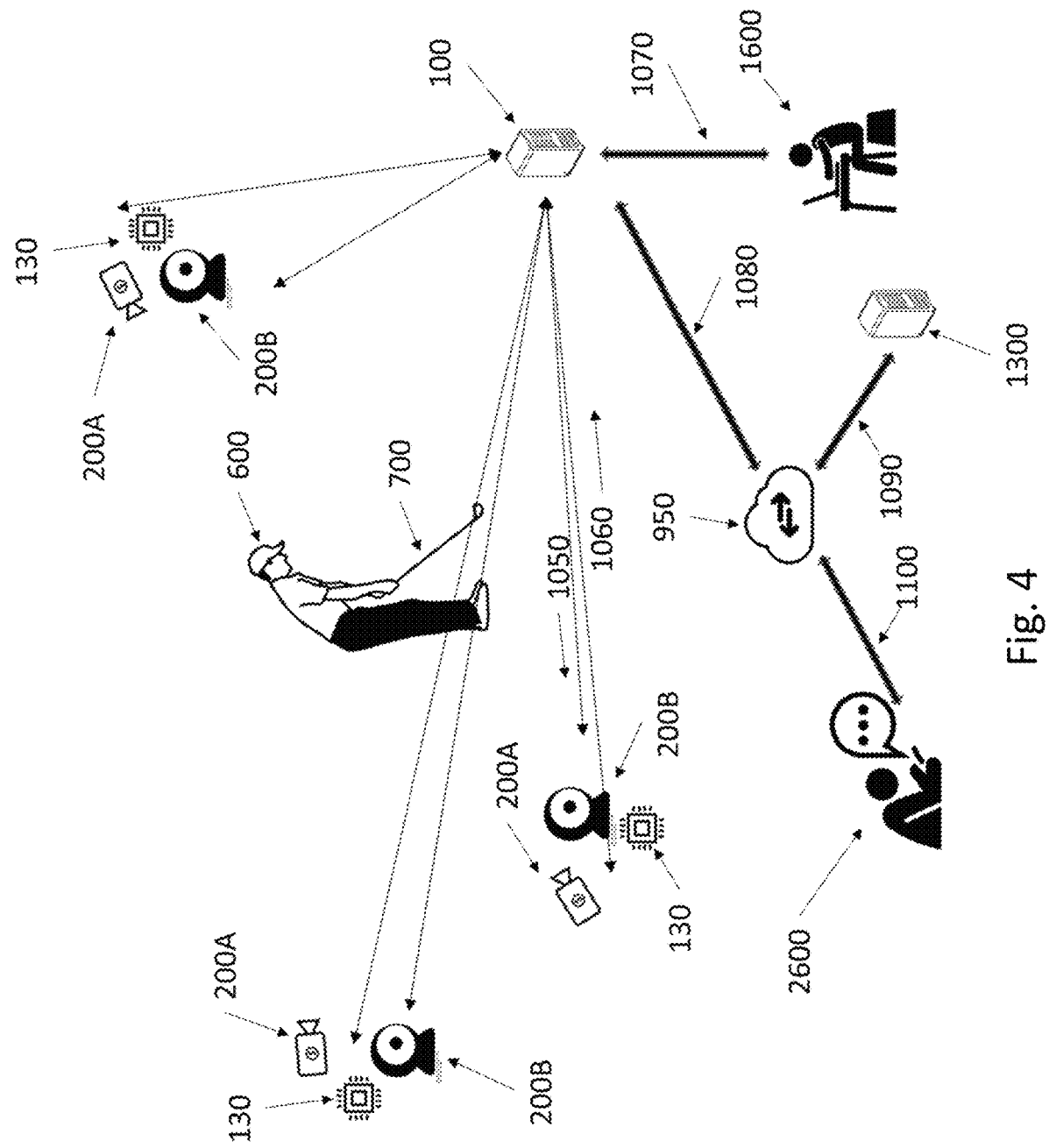
FIG. 4 schematically shows an embodiment of the system with the data flow indicated.

FIG. 4 schematically shows an embodiment of the system with the data flow indicated.

In FIG. 4, wide-angle cameras (200A) sends (1060) video stream to local server (100). Wide-angle cameras (200A) monitor the golf course, in order to identify golfers (600). The local server (150) receives video streams from wide angle (200A) and/or PTZ cameras (200B) and recognizes when golfer (600) is in a shot stance. The local server (100) coordinates (1050) pan, tilt and zoom of at least one pan-tilt-zoom (PTZ) camera (200B) so that at least one PTZ camera (200B), and preferably a plurality of PTZ cameras (200B), is focused on the golfer (600). The local server (100) calculates PTZ coordinates of PTZ cameras (200B) that are appropriate for recording the golfer's (600) swing and sends the PTZ coordinates to the PTZ cameras (200B). Control of a PTZ camera (200B) is via a local processor (130). For each PTZ camera (200B) focused on the golfer, the processor (130) records the stroke and returns (1060) the recording to the local server (100). The local server (100) analyzes the stroke, such as by determining stroke moments and analyzing ball flight data. Round data (golfer IDS, scores, time spent, etc.) are sent (1070) from the local server (100) to golf club staff (1600) and are sent (1080), via the cloud (950) to (1090) an application server (1300). From the application server (1300), data can be sent (1090), via the cloud (950) to (1100) an application user (2600), such as, but not limited to, a golfer mobile application, a coach mobile application and any combination thereof. Local server (100) may execute golfer services, such as sending videos to users (2600) and game scores to application server (1300). Local server (100) may execute golf club services (further described herein, including in reference to Table 1 below).

Figure 5:
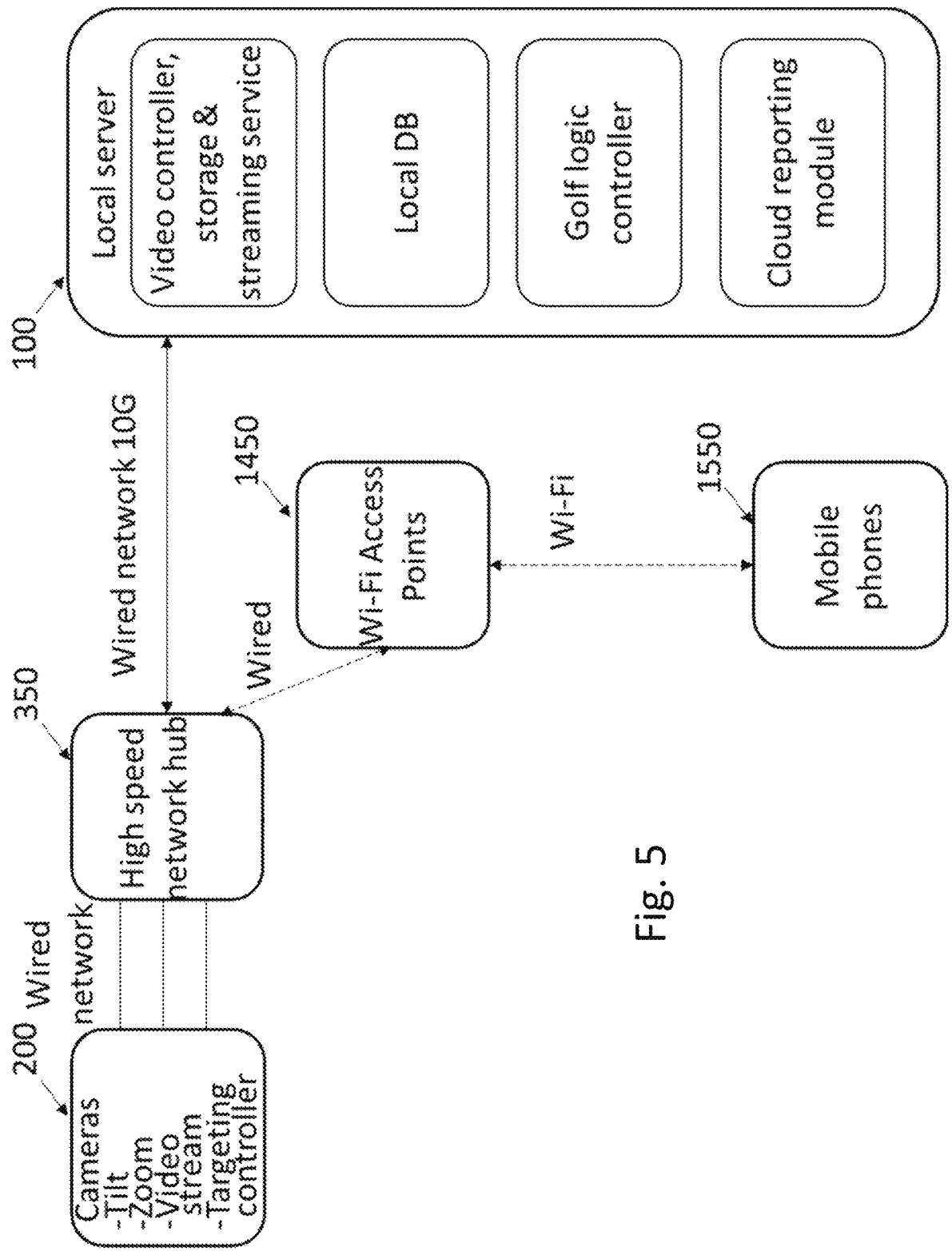
FIG. 5 shows a schematic of an embodiment of the system.

FIG. 5 shows a schematic of an embodiment of the system. Cameras (200) with a targeting controller and capable of tilt, zoom and video stream are connected via a wired network to a high-speed network hub (350).

The high-speed network hub (350) is connected to a local server (100) over a wired connection, and also over a wired connection, to at least one Wi-Fi access point (1450). The at least one Wi-Fi access point (1450) enables connection between the system and at least one mobile phone (1550), so that a golfer can receive, via mobile phone (1550), system information such as swing videos, scores, next person to play, and other system information as disclosed herein. A golfer can also communicate, using a mobile phone (1550), via the system, with other persons, as disclosed herein.

The local server (100) comprises a video controller with a storage and streaming service for control of display of videos and portions of videos; a local database for storage of golfer information, golf club information, scores, swing/stroke libraries and other data, as described herein; a golf logic controller for determining swing/stroke information, scores, order of play, time spent on the course and other data related to the golf game itself, as described herein, as well as a cloud reporting module for communication over the cloud.

Figure 6:
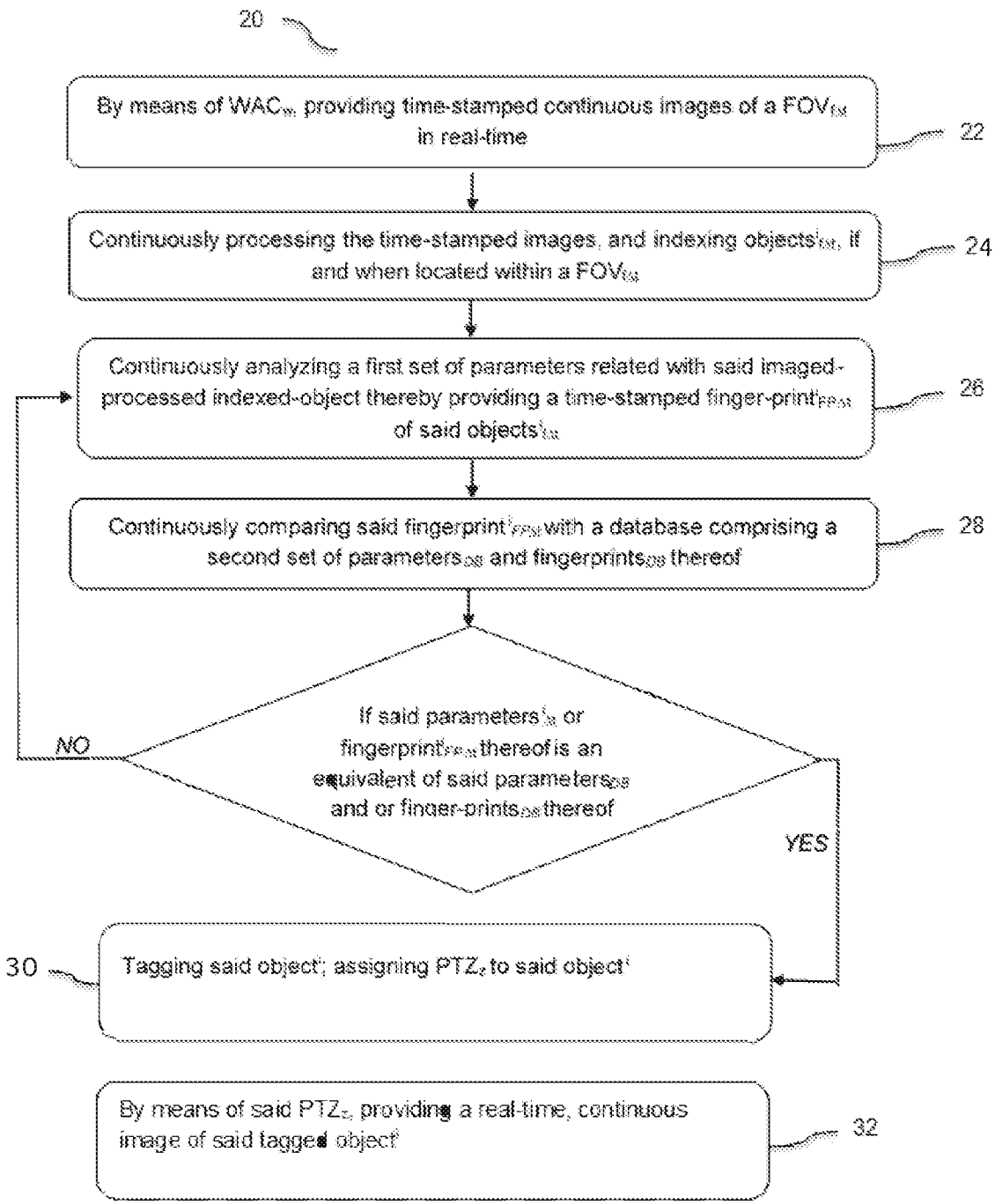
FIG. 6 illustrates a method for identifying and tagging objects on a golf course.

Reference is now made to FIG. 6, illustrating a method (20) for identifying and tagging objects on a golf course. The method (20) comprises the following steps: by means of one or more wide-angle camera/video (hereinafter "WAC"$_w$), continuous, time-stamped images of a FOV$_{f\Delta t}$ are provided in real time (22). The values w and f denote the number of WACs in a certain FOV, and for a specific FOV required for a certain task. The term $\Delta t$ refers either to the time (date) of acquiring the image by the one or more WACs, and also for the time length, in case of video shooting.

The term "continuous images" refers to either a video stream or a train of camera shootings. In some embodiments, in case no object is in a FOV, FOV images are captured periodically, e.g. every 5 seconds or more. When objects are seen in a periodic image of a FOV, a video is rolled, or a train of camera shots are provided at shorter time intervals, e.g. 1 second.

In another step of the method (20), a processor intercommunicating with some or all WACs continuously processes the obtained time-stamped images (24). The processor indexes objects$^i_{f\Delta t}$, if and when located within the FOV$_{f\Delta t}$. The value i is an integer number being equal or greater than 0, namely at a certain time there may be zero objects (empty field). Additionally, or alternatively, when i=0 there may be one or more non-relevant objects, such as trees, cars, birds etc. Images in which i=0 are registered as non-relevant and in most cases do not affect further processing. Additionally, or alternatively, at that certain time there may be one or more relevant objects that are indexed as a first object, a second object, etc., as are associated with both one or more (w) WACs which acquire the image, to the FOV (f) and to the time ($\Delta t$).

Within the scope of the invention, image processing may comprise segmenting and/or clustering the hereto acquired image. In one set of embodiments of the present invention, the computer assisted segmenting of an image and/or clustering the same is/are selected from a group consisting inter alia of various techniques, including region-based segmentation; edge-based segmentation; threshold segmentation; clustering-based segmentation; divisive clustering; agglomerative clustering; k-means clustering; fuzzy C-means clustering; log-based clustering; graph-theoretic clustering; clustering by affinity, distance, intensity, colour, texture and/or motion, and any combination thereof. It is in the scope of the invention that segmentation and clusterization is provided by means disclosed in the art, see e.g., Sharma, Priyansh, and Jenkin Suji. "A review on image segmentation with its clustering techniques." *International Journal of Signal Processing, Image Processing and Pattern Recognition* 9.5 (2016): 209-218.

The method (20) further comprises continuously analyzing the indexed objects for a first set of parameters and accordingly providing a time-stamped fingerprint of each identified object$^i_{f\Delta t}$ or objects in a specific image$^i_{f\Delta t}$ or specific set(s) of images (26), and vice versa. The values i and j are integer numbers being equal or greater than 1. The fingerprinting is set forth for one or more members of a group consisting, inter alia, physical features of an object. These features may include, e.g., dimensions of the object or one or more portions of the object; proportions of the object or one or more portions of the object. The aforesaid features may include telemetry; tag-based identification means and methods thereof; biometric parameters; image recognition, including one or more of detection at one or more of visible wavelengths, NIR, SWIR, MWIR, LWIR, and other wavelengths; one or more of recognition, identification, health monitoring, body temperature monitoring, emotion recognition, facial expressions, access control/authentication, person identification, human-computer interaction, monitoring, and face recognition. See Krišto, Mate, and Marina Ivasic-Kos. "An overview of thermal face recognition methods," 2018 41st *International Convention on Information and Communication Technology, Electronics and Microelectronics (MIPRO)*. IEEE, 2018.

One or more features may be detected by means other than the cameras, including an object's emitted or otherwise detectable smell, an acoustic fingerprint, etc. Features may include a human object's wearables, such as clothes: e.g., shoes pants, shirt, jacket, hat etc., and wearables such as jewelry, a watch, eyeglasses etc. Features may include noticeable features useable for face recognition, voice recognition etc. Features may include personal belongings such as golf clubs, golf club bags, ball(s), and other play-ware. Features may include keys, club cards, credit cards, vehicles etc. for co-identification. Features may include retrievable or detectable signals, including passively obtained signals, and actively obtained signals, such as RFID, WIFI, BT, radio and cellular-communication signals.

Objects' indicia may also be detected and analyzed, and can serve for indexing or later tagging of the objects. An object's indicia include, inter alia, a license plate, labels, numbers, codes, barcodes, and prints thereof.

An object may be associated with one or more second objects, including a human object's family relative, a coworker, an animal (pet), a group of associates, a team, and opponents. Second objects may also be detected and analyzed, and serve for co-indexing or co-tagging as objects or interrelated/intra-related objects.

It is well in the scope of the invention wherein a certain (-singular) fingerprint$^i_{FP\Delta t}$ comprises one certain (-singular) object$^i_{f\Delta t}$. It is also in the scope of the invention wherein a certain (-singular) fingerprint$^i_{FP\Delta t}$ comprises two or more(-multiple) objects$^i_{f\Delta t}$. Hence for example, provided in a non-limiting manner, a first golf player is video-captured and processed as object$^1_{18;\ 3.1.2020,09:32}$ in hole 18 ($FOV_{18}$) and provided a single fingerprint$^1_{18;\ 3.1.2020,09:32}$; whereas at the same time, his/her opponent, namely a second golf player, is video-captured and processed as two objects, namely a player object$^{2(I)}_{18;\ 3.1.2020,09:32}$ in hole 18 ($FOV_{18}$) and his/her associated golf-club bag object$^{2(2)}_{18;\ 3.1.2020,09:32}$ and provided a unified single fingerprint$^2_{18;\ 3.1.2020,09:32}$. A non-movable big old oak tree, standing nearby at the same FOV, is also indexed as fingerprint$^3_{18;\ 3.1.2020,09:32}$ yet it is registered here, under this certain scenario, as a non-relevant item.

In another step, the processor continuously compares the fingerprint$^i_{FP\Delta t}$ with a database comprising a second set of parameters$_{DB}$ and fingerprints$_{DB}$ thereof (28). The record of parameters$_{DB}$ and fingerprints$_{DB}$ thereof is an ever-changing open-list data, stored in retrievable, classified, organized and secure computer readable media. This well-secured database comprises one or more records, and provides for an updatable library which comprises, inter alia, various specifications, parameters, banks of data, including block-chained data, information, images, videos, animated clips, scores, ranks, biometric and personal parameters, bank accounts, etc. Communication with the database is enabled in an authorized manner. Hence, users (here: e.g., golfers) can inline, online and by cellular application retrieve their own scores, updated skills and technique abilities, see more in Example 1; future events and relevant data concerning admission fees etc. Accessibility for a golfer's coach is provided for e.g., golfer's updated scoring as illustrated in Example 1, video clips and lesson's time-tables. A golf club administrator may access some parameters related to the golfer, including his rating and level thereof, preferences: playing mornings of afternoons, playmates, food habits (kosher food, sensitivity to allergens etc.), family members, general interest, smoking habits, credit and money-related parameters etc., see more in Example 2.

In another step, applied only when and if those parameters$^i_{\Delta t}$ or finger-print$^i_{FP\Delta t}$ thereof are found equivalently similar to the parameters$_{DB}$ and/or finger-prints$_{DB}$, namely being identical, equal within a predefined extent (e.g., SD=20%, p=0.01), or being all together comprises a similar operational-module, which works at similar method, and results similarly, hereinafter interchangeably being referred in the term "equivalent"; in such a case of equivalency, steps of tagging the object; assigning PTZ$_z$ camera (PTZ in short) to the object$^i$ (30); and by means of said PTZ$_z$, providing a real-time, continuous image of said tagged object$^i$ (32). The PTZ camera, directed and zoomed on object, provides close-up records in HD, with an ability to dramatically increase quality of video and thus increase probability of identification.

Example 1 in this example, provided herein in a non-limiting manner, the system and methods thereof according to one set of embodiments of the invention are provided useful in sports, exercising and training. Hence for example, in golf, the system analyzes, stores, shares and educates players in various relevant techniques, such as bunker shooting, greenside bunker shooting, shooting near a wall of a bunker, chip shooting, sewing techniques, clubhead aiming.

Individual techniques, group techniques and group vs group techniques are studied. Hence for example, in baseball: swing, rock batting, catching, pitching techniques are analyzed, stored, shared and educates players and catchers. In American football, provided herein in another example, techniques of passing the ball, blocking an opponent, catching the ball, rushing downfield, punts and kicks are hence studied. In judo, hand throwing, hip throwing, foot throwing, grappling, body-striking techniques can be learned. In soccer, techniques of controlling the ball, running with the ball, passing the ball, shooting, goalkeeping techniques etc. are useable for scoring individuals and teams. In basketball, various techniques of jump shot, lay-up, slam dunk, hook shot, alley hoop are provided as an example for e-learning (remote learning) possibilities provided useful by the system. In tennis, techniques of e.g., backhand, forehand and serving are used by the system to avoid injuries. In non-human sports, such as dog agility techniques, the system is provided useful for enhancing results and avoiding frustration in kids, toddlers and persons of special needs.

Example 2

In this example, provided herein in a non-limiting manner, the system according to one set of embodiments of the invention is provided useful in golf playing, educating and club managing.

Club services The hereto disclosed and claimed system is useful for members' and visitors' identification and reidentification. The club acquires knowledge: who played the round, how many rounds each golfer played: member, invited guest, occasional guest. Such aggregated statistics allow creating individual pricing approaches for any golfer. The plan can be calculated based on: how many rounds a golfer played, how long it took him, with whom he played, what light time, etc. Golfers who generally play alone do not receive discounts. Conversely, a golfer who often plays with a company receives a discounted price. To analyze reasons for a rare appearance of a golfer on the course: low qualification, workload, friends missing? The system is useful for identifying golfers: admit allowed players and refuse or alert in case of violators. The system of the present invention provides efficient real-time identification of a golfer who didn't pay. The system is useful for identifying those who settled on the course and play other, those who paid for one round but play more, etc. The system of the present invention is also provided useful for course utilization management. Hence for example, the system provides accurate and real-time data related with golfer's movement estimation for the whole course and each hole. It provides a live map for monitoring of golfers on the course. It provides continuous estimate of data of golfers' speed of movement, in order to predict and avoid traffic situations. The system studies each golfer's speed of movement for flights and tournament formation. The system is useful for identifying free holes on busy days for "few holes" players. It issues an emergency alert for non-moving golfers. The system further provides an automated golfers' identification, potentially, reducing the workload at the reception area and of the marshal; and provide better service for visitors. The system discovers time spent by a golfer in a club, compares it with time spent on a course and analyzes his check. It automatically calculates scores and HCP. It provides easy scores and HCP sharing with all relevant institutions, with no involvement of reception staff required. The system also automatically generates a certificate of score and HCP. It identifies acts of vandalism. The system is useful for internet broadcasting of rounds and tournaments and for creation of an unlimited volume of a club's advertising material. In an embodiment thereof, the system is enabled for an unlimited creation of competitions hourly, daily; weekly, etc. The system identifies the longest driver, close to pin, best score etc., in a fully automated process. The system provides limitless possibility to run a hole-in-one powered by computer. and a greenkeeping-works management application is provided also. The system enables management of work zones, employees, equipment, standard tasks and more; it reports work time and materials usage, and also provides for work time and material planning.

Services for Golfers The system hereto may provide video records of shots, for game improvement; 3D body modeling for advanced game improvement; automated tips generated by machine learning; tracking of golfers on course route based in video analytics; shots and results in video sharing; and all-club all-golfer golf-activity sharing. The system is useful for providing an online rule automatic-adviser. Based on position of a player on the course, related e.g., to slopes and hole locations, the system suggests possible actions for a specific situation according to club rules. The system guides and helps in out-of-bounds situations like get back and stroke again, drop with one penalty, must play etc. The system ensures no cheating for all play within the fairway. Likewise, a video-like new football regulations can resolve any dispute.

Round results In some embodiments, the system provides automated score and HCP calculation electronic scorecard generation and assignment; and easy scores, HCP sharing with all relevant institutions, with no involvement of reception staff required. The system provides an online customer service for clients; and enables play of a qualification round alone. The system is useable as an objective and accurate time-resolved marker.

Example 3

The system is also useful in a vehicle: door opening, window shutting, lighting, wheel steering, key switching; and any mixture, combinations, shape, colors, indicia thereof.

Example 4

Reference is made again to FIG. 6. A method (20) for identifying and tagging objects on a golf course is hereto illustrated in a non-limiting manner. A system is characterized by one or more $WAC_w$, each of which is configured provide real-time continuous images of a $FOV_{f\Delta t}$ (22), w and f are integer numbers being equal or greater than 1. The system further comprises one or more $PTZ_z$, each of which is configured provide real-time continuous images of at least one $object^i$ within the $FOV_{f\Delta t}$, z and i are integer numbers being equal or greater than 1. The system also comprises a processor and intercommunicated database, operable in a method of: (i) continuously processing the time-resolved images, thereby indexing $object^i_{f\Delta t}$ if and when located within the $FOV_{f\Delta t}$ (24); (ii) continuously analyzing a first set of parameters related with the imaged-processed and indexed object, thereby providing a time-resolved $fingerprint^i_{FP\Delta t}$ of the $object^i_{f\Delta t}$ (26); (iii) continuously comparing the $fingerprint^i_{FP\Delta t}$ with the database, comprising a second set of $parameter_{DB}$ and $fingerprint_{DB}$ thereof (28); (iv) if the $parameters^i_{\Delta t}$ or $fingerprint^i_{FP\Delta t}$ thereof is an equivalent of the $parameter_{DB}$ and or $finger-print_{DB}$ thereof, tagging the $object^i$; assigning $PTZ_z$ to the $object^i$ (30); and (v) by means of the $PTZ_z$, providing a real-time, continuous image of the tagged $object^i$ (32).

Figure 7A:
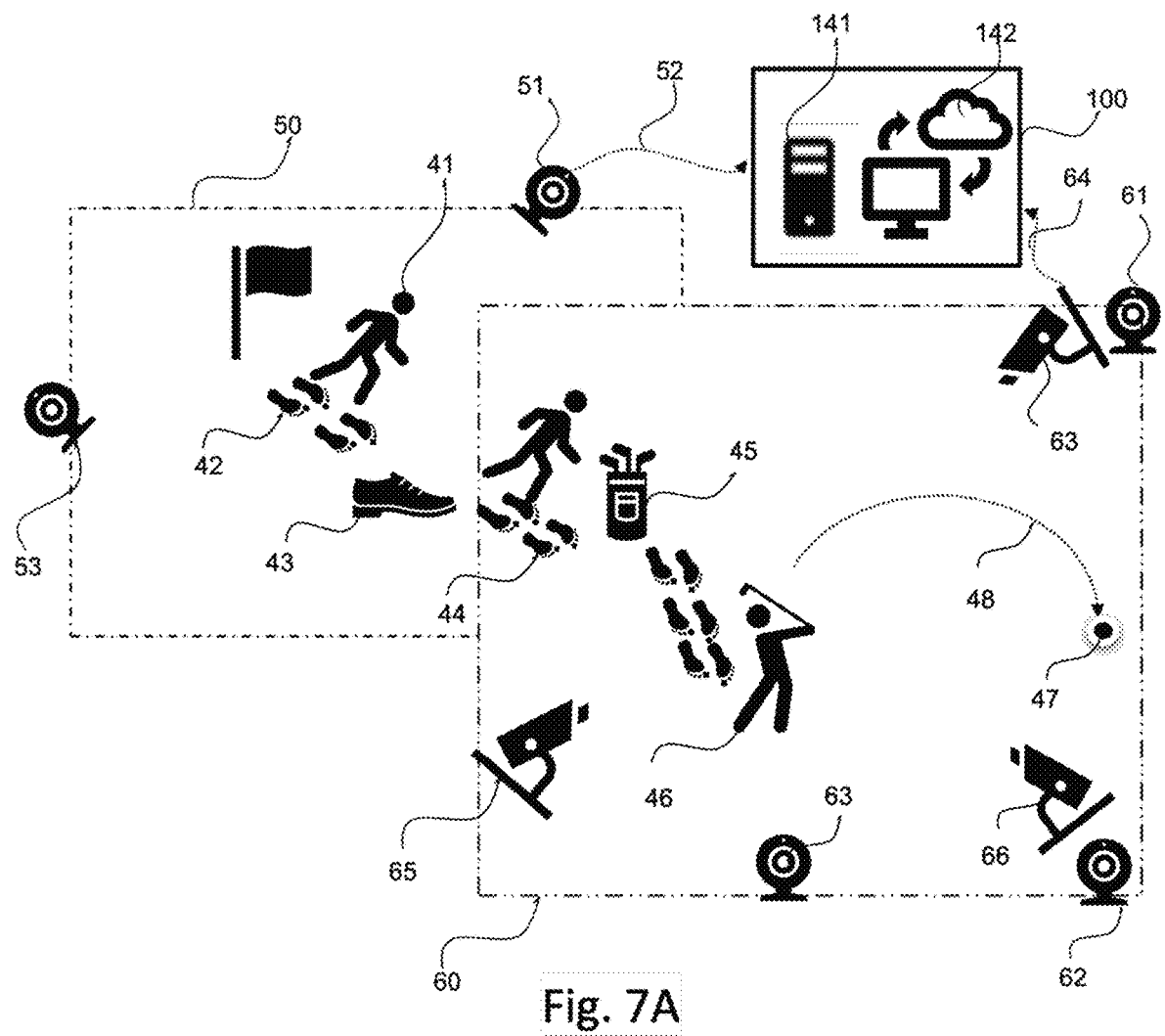
FIG. 7A illustrates a system for identifying and tagging objects on a golf course.

Hence for example, provided herein in a non-limiting manner, a system for identifying and tagging objects on a golf course as schematically illustrated in FIG. 7A, a first golf player (41) is located at a first $FOV_1$ (50). The golfer movements (42) are continuously monitored by two $WACs_{51,53}$ aimed to the $FOV_1$ and intercommunicated (52) with a main server (140) comprising a processor (141), computerized communicator and storage (142). At a certain date, namely Jul. 3, 2020, at the exact time of 14:56 and 43 seconds (2020:07:03:14:56:43) the golfer stops walking, pattern recognition provided via one of the two, namely $WAC_{51}$ (52) analyzes golfer body-gestures at real-time as movement stops, golfer is bending, then shoelace tying (43). After a short while, i.e., about 4 minutes, when golfer is advances (44) to another $FOV_2$ (60) continuously monitored by a set of three WACs, namely $WAC_{61-63}$. In a location within the $FOV_2$ (60), at time 2020:07:03:15:00:25, the golfer stops and take a golf club from his/her bag (45). The processor receives the data (24) and on-line compares this movement: namely, this set of actions of (i) stop walking and (ii) taking out a club from a bag, with relevant database records. As the hereto detected set of actions are found being equivalent to the preregistered parameters in the database, these time-resolved actions are flagged and an array of three PTZ cameras ($PTZ_{23,25,26}$) are registered from acquiring his/her time resolved image while preparing to shot (5) the ball (7) in a monitorable track (8); focusing golfer (6) from tree different angles: 23, 26, and 25.

Example 5

Figure 7B:
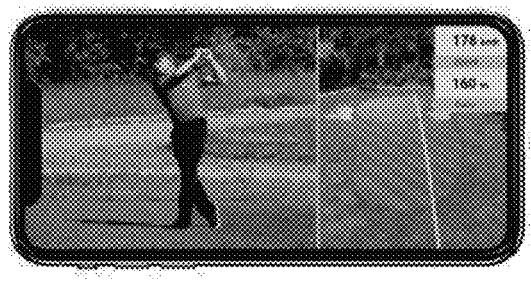
FIG. 7B depicts an embodiment of automatic stroke recording with the combination of AI and machine learning.
Figure 7C:
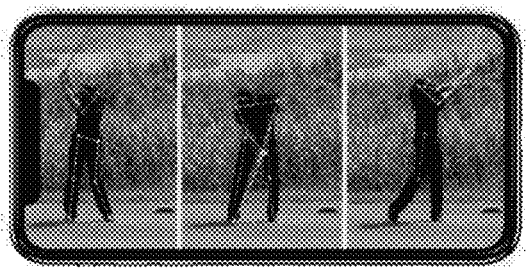
FIG. 7C depicts an embodiment of a mobile application provided by the system and method of the present invention.

Reference is now made to FIG. 7B, depicting an automatic stroke recording with the combination of AI and machine learning, system recognizes and records all actions on the course. Reference is now made to FIG. 7C, illustrating a mobile application provided by the system and method of the present invention. Golfers can book tees and club services, get access to their videos, follow course map and use online scorecard.

Figure 8:
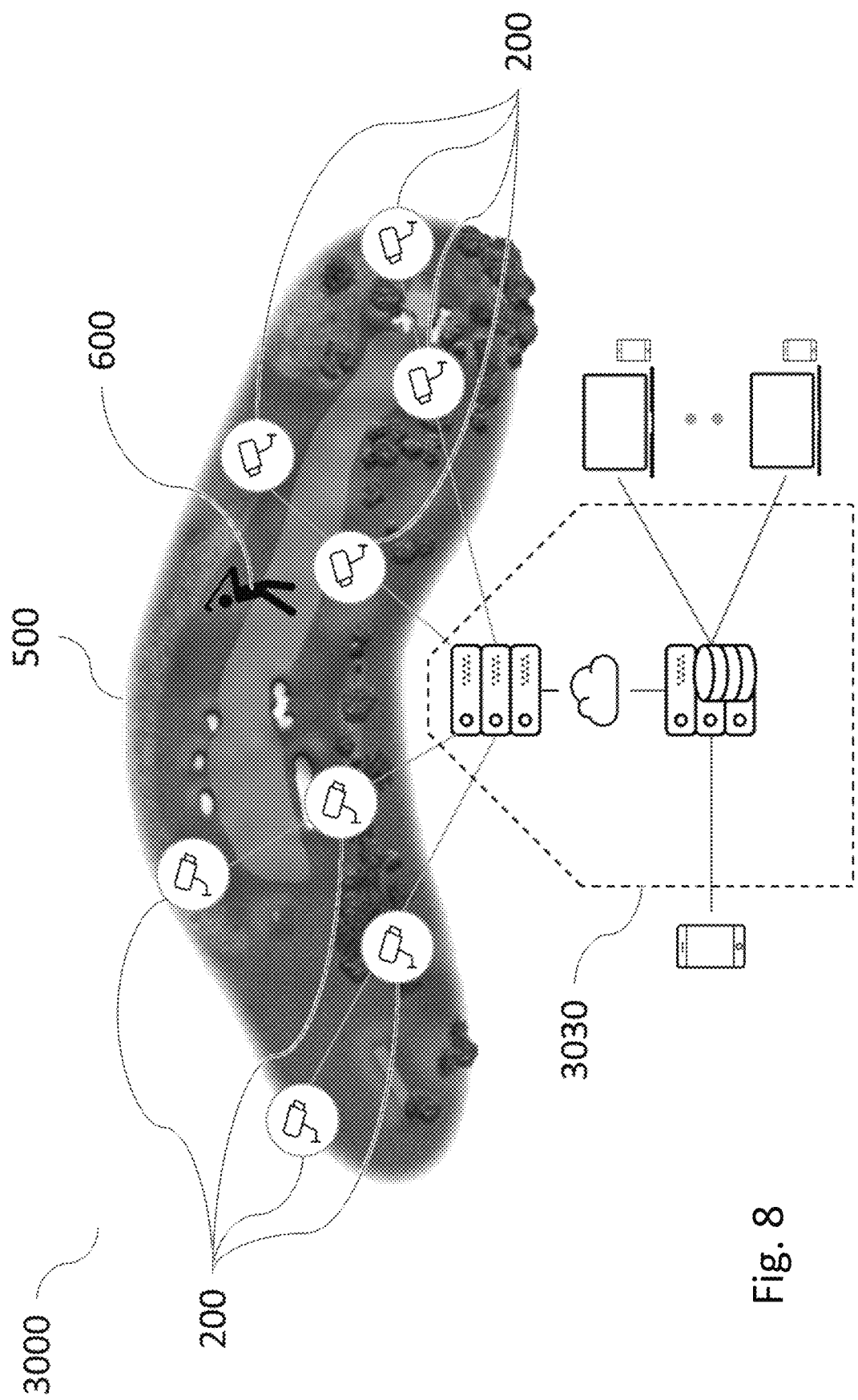
FIG. 8 shows an embodiment of a system for providing a virtual golf coach, according to some embodiments of the invention.

Reference is now made to FIG. 8, showing an embodiment of a system (3000) for providing a virtual golf coach, according to some embodiments of the invention.

Cameras (200), for some embodiments further described herein, are positioned on a section of golf course (500) and can be adjusted to capture, inter alia, videos of a golf swing of a golfer (600) from different angles. In preferred embodiments, cameras (200) are widescreen imaging, full HD, and/or have a viewing angle greater than 80° (at infinity focus). Cameras (200) have a pan-tilt-zoom (PTZ) function.

Typically, cameras (200) are distributed over 80 to 150 capture points over an 18-hole course.

Cameras (200) may be mounted on mounting assemblies and secured to structures on golf course (500). Installation of cameras (200) may require special adapters for mounting and securing cameras (200) to structures. The structures typically comprise pillars, usually one pillar per capture point, specially installed on golf course (600) for securing cameras (200). Alternatively, or in addition, mounting structures comprise existing structures of golf course (600).

Figure 9:
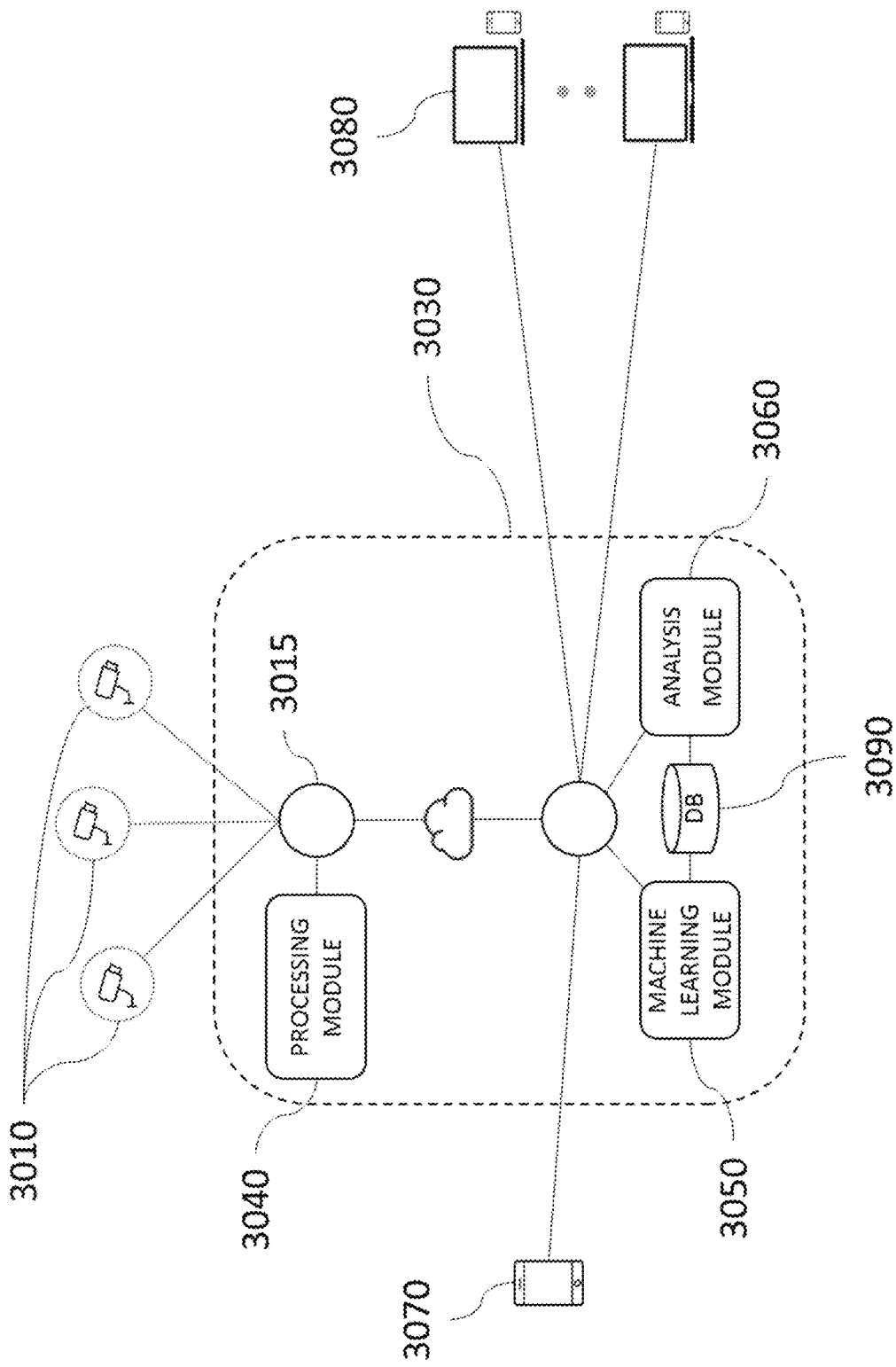
FIG. 9 shows a functional block diagram for a server network of a virtual golf coach system.

System (3000) further comprises a network (3030) of one or more servers. FIG. 9 shows a functional block diagram of server network (3030).

Server network (3030) comprises a video receiver (3015). Video receiver (3015) receives video signals from cameras (3010). In preferred embodiments, communication from cameras (3010) to video receiver (3015) is by 1 Gbit/sec fiber optic connections, but may comprise any combination of connections such as fiber optic, electrical cable, and wireless connections, at any bit rate or bandwidth suitable for video transmission.

Server network further comprises a processing module (3040). Processing module (3040) processes video stream data received from at least some of cameras (3010). Processing module (3040) identifies objects in the foreground—e.g. the golfer (600), club, and ball—and isolates the objects in the background. Processing module (3040) may be employ a pedestrian detection algorithm to identify persons on golf course (600). A non-limiting example of such an algorithm is described in Ref [2]. Alternatively, or in addition, processing module (3040) may employ one or more deep learning neural network algorithms in Refs. [3] and [4], including algorithms therein in relation to objects on a golf course, Processing module (3040) further analyzes the video stream data to identify golfer (600) among several persons identified. Identifying of golfer (600) may employ algorithms based on appearance, motion models, interaction models, overlapping models, or any combination of these and others.

In conjunction with identifying golfer (600), processing module (3040) may additionally track a trajectory of golfer (600) on golf course (200). To track the golfer's (600) trajectory, processing module (3040) may employ a tracking-learning-detection (TLD) algorithm, possibly modified by a neural network algorithm. Tracking may be based on the level of skill of golfer (600), such as distances of shots previously made by golfer (600). Tracking may employ ball trajectory predictions, further described herein. Processing module (3040) analyzes golfer's (600) trajectory to identify events such as a stoppage of golfer (600), including stoppages before taking a swing, including a swing at a golf ball. Further details regarding trajectory tracking are disclosed in Refs. [7], [8], and [9], and are featured in some embodiments.

Processing module (3040) may be configured to perform one or more of counting hits, differentiating between practice swings and swings intended to hit a ball, identifying time and location of contact between the ball and club, Processing module (3040) may be configured to determine one or more of a 3D location of at least a portion of golfer (600), distance moved by golfer (600), direction moved by golfer (600), angle of inclination golfer (600), pressure exerted by golfer (600) on a golf club.

Processing module (3040) may be in communicative connection with cameras' (200) controls. Processing module (3040) may adjust the pan, tilt, and zoom of a camera (200) in real time in order to aim cameras (200) at golfer (600), to zoom and focus, and possibly to adjust other settings, for best video shots of golfer's (600) actions. Processing module (3040) activates video recording, for cameras (200) that are set for recording the golfer's swing, during time intervals that processing module (3040) determines golfer (600) is taking a swing, including a swing at a golf ball.

Processing module (3040) analyzes the videos recordings to model the trajectory of the golf swing, employing a modeling algorithm. The stroke trajectory-modeling algorithm may dynamically identify the club shaft and club head. The algorithm may further divide the swing into intervals before and during the strike. The algorithm may further compute or approximate a polynomial characterizing the swing and/or trajectory. The algorithm may further compute or approximate speed and/or acceleration of the golf ball and/or the club head upon striking the golf ball.

For assistance in trajectory modeling, a swing-trajectory modeling algorithm may draw bounding rectangles in the video of the swing, placed around the hands and club. The rectangles may be analyzed based on a histogram of oriented gradients (HOG) signs and trained by an adaptive boosting (AdaBoost) training algorithm. The algorithm may output a 3D swing-trajectory model and/or a 3D strike-trajectory model of the portion of the swing during the strike.

Processing module (3040) may compute, from the videos of a swing, a 3D model of golfer (600) or access such a 3D model from user data of golfer (600) stored on network (3030). The stored golfer model may be developed from an aggregation of videos of the golfer's (600) swings. The golfer model can be a wire model of golfer (600).

System (3000) further comprises a machine learning module (3050). Machine learning module (3050) receives trajectory models of one or more swings and/or strikes, as well as models of one or more golfers. Learning data is acquired from swings of professional golfers. Machine learning model may develop a reference swing/strike, based on an aggregation of learning data comprising the swing/strike models of professional golfers and recommendations of golf experts. A reference swing/strike may be developed from a single professional golfer's swings/strikes or from an amalgamation of a plurality of professional golfer's swings/strikes. In computing the reference, each swing/strike may be weighted according to the outcome of the professional's swing/strike and/or according to experts' assessments. Machine learning module (3050) may also receive analysis of golf experts or trainers of swings/strikes of golfer (600) and other golfers, such as tips for improvement of swing/stroke. Having significant data sets with tips enables machine learning module (3050) to find out and suggest a tip for golfer (600). Learning data is stored in a database (3090).

System (3000) further comprises an analysis module (3060). When golfer (600) takes a swing, analysis module (3060) receives the swing/strike model and his golfer model. Analysis module (3060) compares reference swing/strike to a reference swing/strike. Analysis module (3060) compares golfer's (600) swing/strike with a reference swing/strike. Analysis module (3060) computes recommendations for how golfer (600) may improve his swing. Recommendations may comprise instructions for improving overall characteristics of the swing/strike, such as stance, grip, tempo, and release. Recommendations may be delivered to a display device (3070) of said golfer (600).

In preferred embodiments, machine learning module (3050), analysis module (3060), and database (3090) are hosted on a cloud server.

Training data may also take into account the trajectory and speed (collectively, movement trajectory) of the golf ball after the strike. Processing module (3040) may determine the movement trajectory based on the video data. Processing module (3040) may employ Kalman filter algorithm in order to compute the movement trajectory. Further details for building and predicting the trajectory of an object in three-dimensional space are given in Refs. [24] and [25]. Further details for restoring a three-dimensional scene from images from uncalibrated cameras are given in Refs. [26]-[28].

It is understood that the virtual coach system (3000) may possess features of or be used in conjunction with other embodiments of the invention presented herein, including those described in connection with FIGS. 1-7.

Table 1 below shows an example of services made available to a subscribing golfer (600). Services options may be selected at various levels of subscription (Silver, Gold Platinum) or on a one-time (daily) basis.

TABLE 1

| Golfers | Daily pass | Silver (annual commitment) | Gold (annual commitment) | Platinum (annual commitment) |
| --- | --- | --- | --- | --- |
| Shots Video recording (Video only) | ✓ | ✓ | ✓ | ✓ |
| Automated scoring | ✓ | ✓ | ✓ | ✓ |
| Personal Digital scorecard no signature | ✓ | ✓ | ✓ | ✓ |
| Scores history | ✓ | ✓ | ✓ | ✓ |
| Course heat map | ✓ | ✓ | ✓ | ✓ |
| Flight Digital scorecard with markers electronic signature | ✓ | | ✓ | ✓ |
| HCP calculation | ✓ | | ✓ | ✓ |
| HCP registration | ✓ | | ✓ | ✓ |
| Shots Video recording + 2D schematic ball flight visualization | ✓ | | ✓ | ✓ |
| 3D Ball flight visualization | ✓ | | ✓ | ✓ |
| Ball flight data, club attack data | ✓ | | ✓ | ✓ |
| Unified round highlight video | ✓ | | | ✓ |
| 3D body modeling, swing training | ✓ | | | ✓ |
| 2D tactic training, according to personal golfer performance | ✓ | | | ✓ |
| Physio recommendation | ✓ | | | ✓ |
| Ads free | | | | ✓ |

REFERENCES

The following documents are incorporated by reference in their entireties into this Application.
1. Benenson R., Omran M., Hosang J., Schiele B. (2015) Ten Years of Pedestrian Detection, What Have We Learned?. In: Agapito L., Bronstein M., Rother C. (eds) Computer Vision-ECCV 2014 Workshops. ECCV 2014. Lecture Notes in Computer Science, vol 8926. Springer, Cham
2. Paisitkriangkrai S., Shen C., van den Hengel A. (2014) Strengthening the Effectiveness of Pedestrian Detection with Spatially Pooled Features. In: Fleet D., Pajdla T., Schiele B., Tuytelaars T. (eds) Computer Vision—ECCV 2014. ECCV 2014. Lecture Notes in Computer Science, vol 8692. Springer, Cham
3. Zhao Z Q., Bian H., Hu D., Cheng W., Glotin H. (2017) Pedestrian Detection Based on Fast R-CNN and Batch Normalization. In: Huang D S., Bevilacqua V., Premaratne P., Gupta P. (eds) Intelligent Computing Theories and Application. ICIC 2017. Lecture Notes in Computer Science, vol 10361. Springer, Cham
4. Angelova, Anelia & Krizhevsky, Alex & Vanhoucke, Vincent & Ogale, Abhijit & Ferguson, Dave. (2015). Real-Time Pedestrian Detection with Deep Network Cascades. 32.1-32.12. 10.5244/C.29.32.
5. W Luo, J Xing, A Milan, X Zhang, W Liu, X Zhao . . . Multiple object tracking: A literature review arXiv preprint arXiv:1409.7618v4, 2017
6. W Luo, J Xing, A Milan, X Zhang, W Liu, X Zhao . . . Multiple object tracking: A literature review arXiv preprint arXiv:1409.7618, 2014
7. Yang T., Cappelle C., Ruichek Y., El Bagdouri M. (2017) Object Tracking Based on Modified TLD Framework Using Compressive Sensing Features. In: Sidorov G., Herrera-Alcántara O. (eds) Advances in Computational Intelligence. MICAI 2016. Lecture Notes in Computer Science, vol 10061. Springer, Cham
8. S. Sharma, A. Khachane and D. Motwani, "Real time multi-object tracking using TLD framework," 2016 International Conference on Inventive Computation Technologies (ICICT), Coimbatore, 2016, pp. 1-6. doi: 10.1109/INVENTIVE.2016.7824839
9. 3D tracking of Rigid objects in RGB video (http://tldvision.com/t1d3.html)
10. Multi-Camera Networks principles and applications (2009), doi:10.1016/B978-0-12-374633-7.00011-2 by Hamid Aghajan, Andrea Cavallaro
11. Nicolas Gehrig, Vincent Lepetit, Pascal Fua, "Visual Golf Club Tracking for Enhanced Swing Analysis", Computer Vision Laboratory (CVLab) Swiss Federal Institute of Technology (EPFL) 1015 Lausanne, Switzerland, 2003. (https://www.tugraz.at/fileadmin/user_upload/Institute/ICG/Images/team_lepetit/publications/gehrig_bmvc03.pdf)
12. "Golf video tracking based on recognition with HOG and spatial-temporal vector", 2017 (http://j ournals.sagepub.com/doi/full/10.1177/1729881417704544)
13. R. Urtasun; D. J. Fleet; P. Fua "Monocular 3-D Tracking of the Golf Swing", 2005, (http://www.cs.toronto.edu/~fleet/research/Papers/cvpr05.pdf)
14. Dollar, P, Appel, R, Belongie, S. Fast feature pyramids for object detection. IEEE Trans Pattern Anal Mach Intell 2004; 36: 1532-1545. Google Scholar, Crossref, ISI
15. Choi, A, Joo, S B, Oh, E. Kinematic evaluation of movement smoothness in golf: relationship between the normalized jerk cost of body joints and the clubhead. Biomed Eng Online 2014; 13(1): 1-12. Google Scholar, Crossref, Medline, ISI
16. Rui Hou, Chen Chen, Mubarak Shah "Tube Convolutional Neural Network (T-CNN) for Action Detection in Videos" (http://crcv.ucfedu/papers/iccv17/T-CNN-camera-ready.pdf)
17. Serena Yeungl, Olga Russakovskyl,2, Greg Mori3, Li Fei-Feil "End-to-end Learning of Action Detection from Frame Glimpses in Videos" (http://vision.stanford.edu/pdf/yeung2016cvpr.pdf)
18. Zhe Cao Tomas Simon Shih-En Wei Yaser Sheikh, "Realtime Multi-Person 2D Pose Estimation using Part Affinity Fields" (https://arxiv.org/pdf/1611.08050.pdf)
19. H. Briceno, B. Michoud, S. Bouakaz and E. Guillou, "Real-Time Marker-free Motion Capture from multiple cameras," 2007 11th IEEE International Conference on Computer Vision(ICCV), Rio de Janeiro, 2007, pp. 1-7. doi:10.1109/ICCV.2007.4408991
20. Jackson, Brandon E. et al "3D for the people: multi-camera motion capture in the coursewith consumer-grade cameras and open source software." Biology Open 5.9 (2016): 1334-1342. Web. 9 Oct. 2018.
21. Real-time multi-camera stream analysis for player interaction in a 3D world (link: https://www.scss.tcd.ie/publications/theses/diss/2008/TCD-SCSS-DISSERTATION-2008-021.pdf)
22. Large image dataset designed for object detection, segmentation, person keypoints detection, stuff segmentation, and caption generation (https://github.com/coco-dataset/cocoapi)
23. Kamble, P. R., Keskar, A. G. & Bhurchandi, K. M. Artif Intell Rev (2017). https://doi.org/10.1007/s10462-017-9582-2
24. Lingli Zhu, A PIPELINE OF 3D SCENE RECONSTRUCTION FROM POINT CLOUDS Doctoral dissertation for the degree of Doctor of Science in Technology to be presented with due permission of the School of Engineering for public examination and debate in Auditorium M1 at the Aalto University School of Engineering (Espoo, Finland) on the 18th of June at 12 noon.
25. Mariusz Siudak, A Survey of Passive 3D Reconstruction Methods on the Basis of More than One Image, Machine GRAPHICS & VISION vol. 24, no. 3/4, 2014 pp. 57-117
26. Adrien Bartoli, Peter Sturm. Constrained Structure and Motion From Multiple Uncalibrated Views of a Piecewise Planar Scene. International Journal of Computer Vision, Springer Verlag, 2003, 52, pp. 45-64.
27. Han, Mei & Kanade, Takeo. (2000). Scene Reconstruction from Multiple Uncalibrated Views.
28. 3D Scene Reconstruction from Multiple Uncalibrated Views (https://web.stanford.edu/class/cs231a/prev_projects_2016/xuerong_Itao2_report.pdf)
29. McTeigue M, Lamb S R, Mottram R, Pirozzolo F. Farrally M R, Cochran A J. Spine and hip motion analysis during the golf swing; Science and Golf II; World Scientific Congress of Golf; July 4-8; London: E &FN Spon; 1994. pp. 50-8.
30. Evans K, Tuttle N. Improving performance in golf: current research and implications from a clinical perspective. Braz J Phys Ther. 2015; 19(5):381-9.

The invention claimed is:

1. A system for providing a virtual golf coach, said system comprising:
one or more cameras configurable to capture a set of video recordings from one or more angles of a swing and/or strike of a golf club by a golfer;
a network of one or more servers, said network in communicative connection with said cameras and said network comprising:
a processing module configured to:
receive said set of videos;
3D model the trajectory of said swing/strike;
3D model said golfer;
a machine learning module configured to:
receive one or more of said 3D swing-trajectory and golfer models of said swings/strikes for one or more professional golfers;
compute a 3D model of one or more reference swings, as a function of an aggregation of said swings/strikes of professional golfers;
a database configured for storing said reference swing(s)/strike(s);
an analysis module configured to:
receive said 3D swing/strike trajectory model for said golfer;
receive said 3D golfer model;
compare said 3D trajectory model with a said reference swing;
compute one or more recommendations for said golfer, as a function of said comparison; and
a display module configured to display said recommendations to said golfer.

2. The system of claim 1, wherein computing said reference swing is further a function of recommendations of one or more golf experts.

3. The system of claim 1, wherein said 3D trajectory model is divided into a portion before said strike and a portion during said strike.

4. The system of claim 1, wherein said 3D modeling of said golfer's swing draws bounding rectangles in said videos around said hands and said club and analyzes said rectangles based on HOG signs trained by an AdaBoost training algorithm.

5. The system of claim 1, wherein said processing model is further configured to compute a model of said golfer.

6. The system of claim 1, wherein said processing module is configured to compute a trajectory of a golf ball driven by said strike, employing a Kalman filter algorithm.

* * * * *